United States Patent [19]

Hayashi et al.

[11] Patent Number: 5,283,658
[45] Date of Patent: Feb. 1, 1994

[54] IMAGE FORMING APPARATUS WITH TTL TO ECL CONVERSION BETWEEN READING AND PRINTING CIRCUITS

[75] Inventors: Kimiyoshi Hayashi, Soka; Masanori Sakai, Yokohama, both of Japan

[73] Assignee: Canon Kabushiki Kaisha, Tokyo, Japan

[21] Appl. No.: 980,440

[22] PCT Filed: Nov. 23, 1992

Related U.S. Application Data

[63] Continuation of Ser. No. 613,866, filed as PCT/JP90/00594, May 10, 1989, abandoned.

[30] Foreign Application Priority Data

May 10, 1989 [JP] Japan ................................. 1-118469

[51] Int. Cl.$^5$ .............................................. H04N 1/40
[52] U.S. Cl. ........................................ 358/296; 361/752; 361/816
[58] Field of Search ................ 358/296, 298; 307/475; 361/399, 424; 346/108, 160

[56] References Cited

U.S. PATENT DOCUMENTS

| | | | |
|---|---|---|---|
| 4,339,822 | 7/1982 | Kolodzey | 372/38 X |
| 4,375,065 | 2/1983 | Ohara | 358/298 X |
| 4,894,753 | 1/1990 | Wadell et al. | 361/424 |
| 4,905,022 | 2/1990 | Nagasawa | 358/296 X |
| 4,973,863 | 11/1990 | Gotta, III et al. | 307/475 |

FOREIGN PATENT DOCUMENTS

| | | |
|---|---|---|
| 0276107 | 7/1988 | European Pat. Off. |
| 63-142472 | 6/1988 | Japan |
| 63-293062 | 11/1988 | Japan |
| 2185167 | 7/1987 | United Kingdom |

OTHER PUBLICATIONS

Canon Inc.: Service Manual: Canon Laser Copier (CLC 1); Jul., 1987; pp. 3–13p.

Primary Examiner—Benjamin R. Fuller
Assistant Examiner—Eric Frahm
Attorney, Agent, or Firm—Fitzpatrick, Cella, Harper & Scinto

[57] ABSTRACT

This invention relates to an image forming apparatus for forming an image using a pulse modulated signal based on an input image signal. A circuit for pulse-modulating an image signal and a circuit for driving a recording element are integrally formed on a single circuit board, or a circuit means for isolating a signal level of another circuit, e.g., a circuit for digitally processing an image signal or a circuit for generating a control signal from that of the pulse modulation circuit is arranged, so that a pulse modulation signal to be applied to the recording element is stabilized, and a high-frequency operation is allowed.

19 Claims, 19 Drawing Sheets

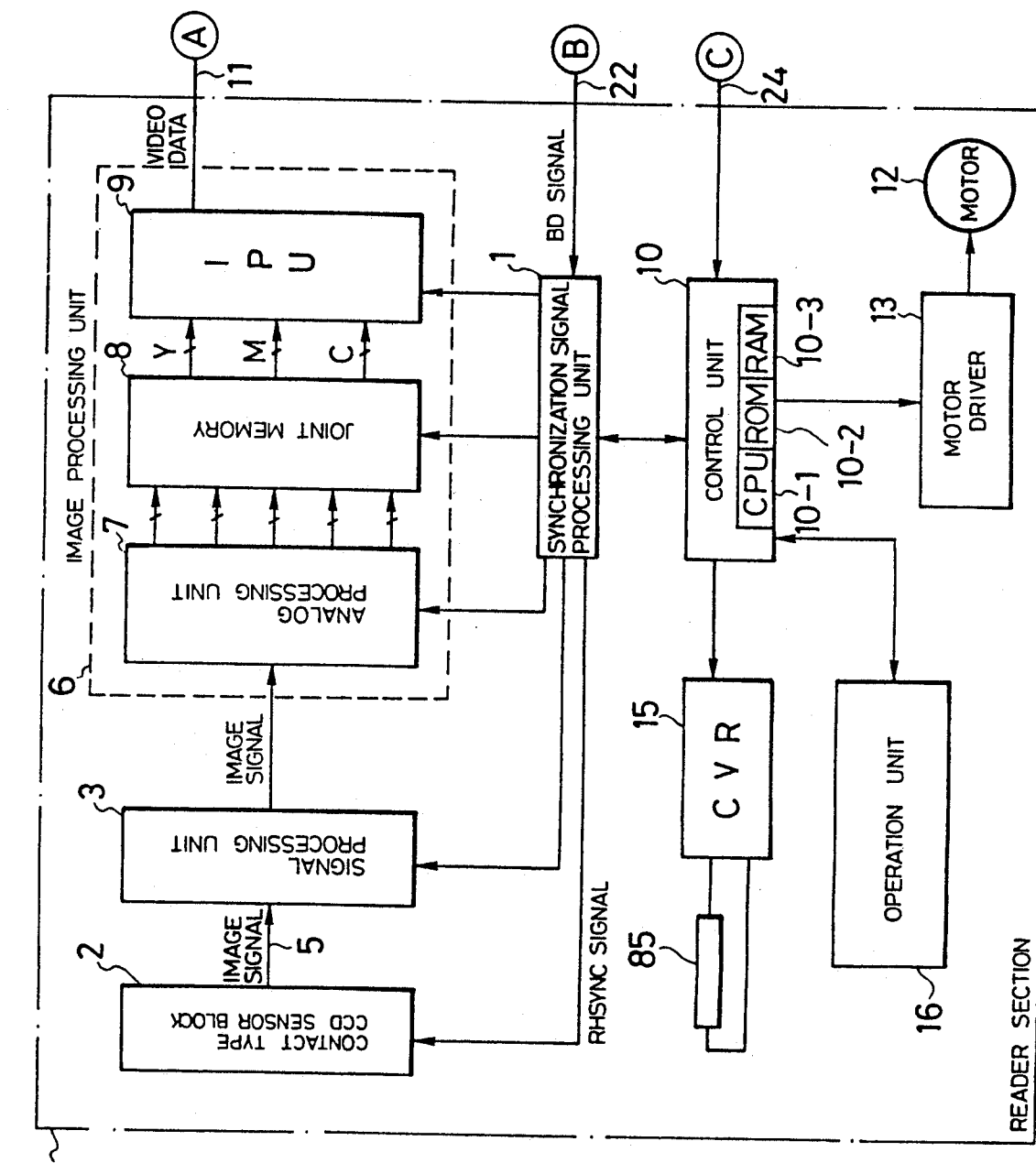

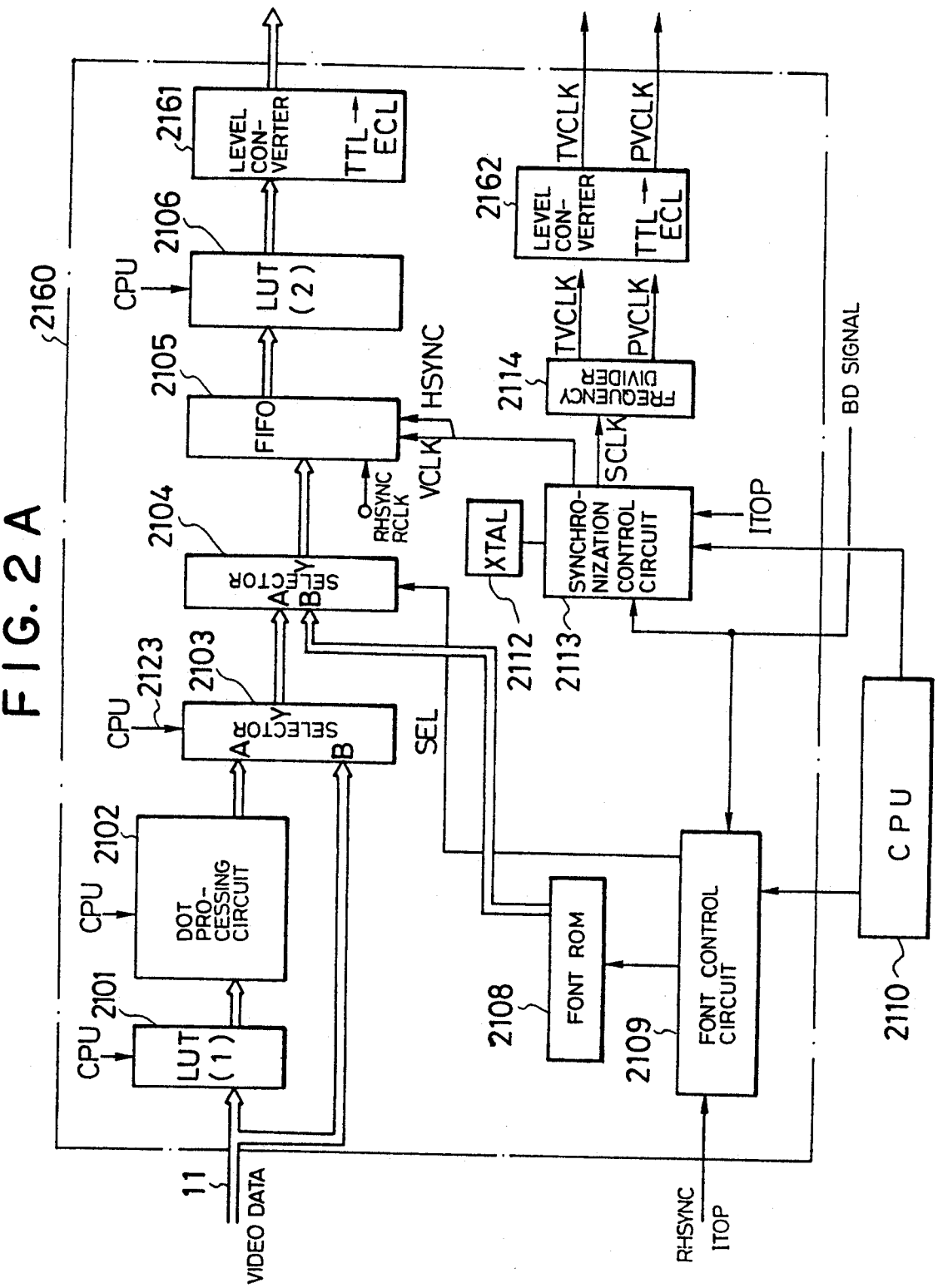

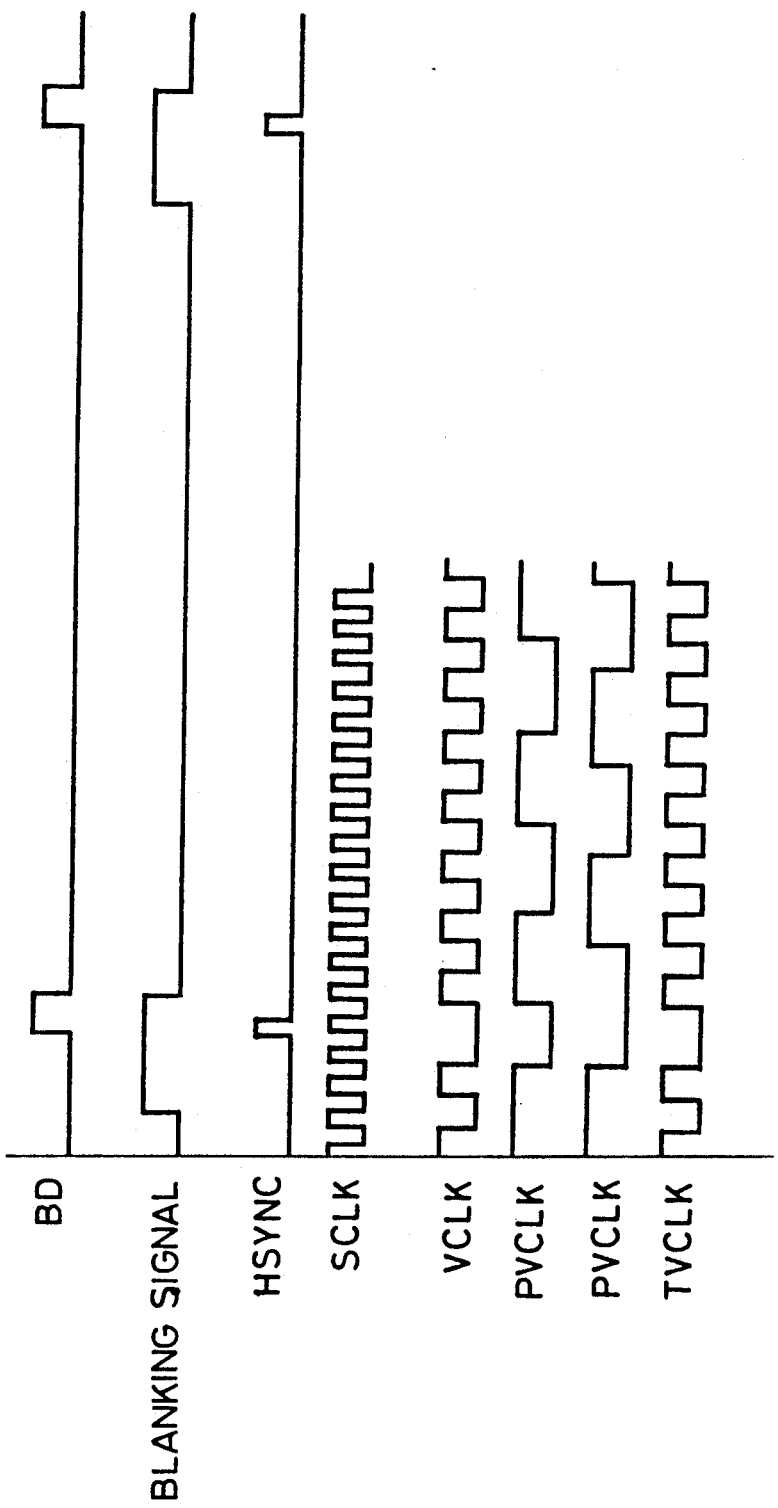

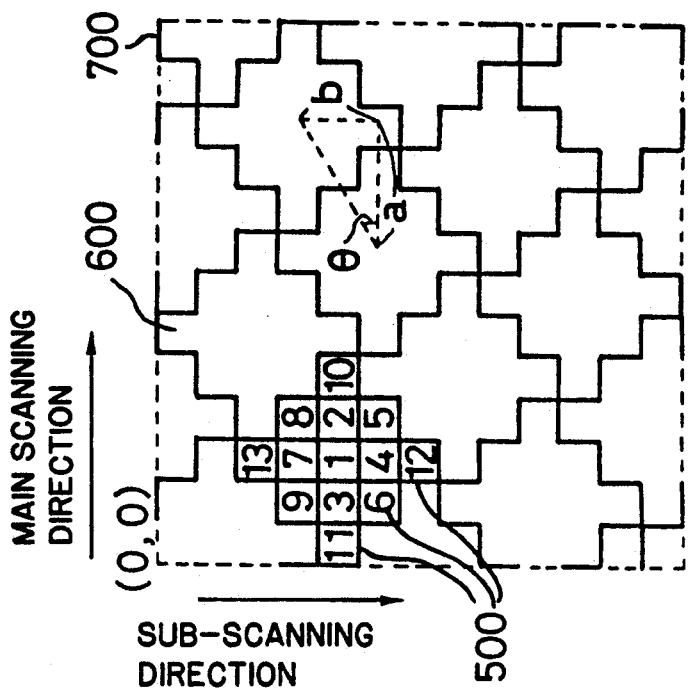
FIG. 4B  Magenta (θ=33.7°)
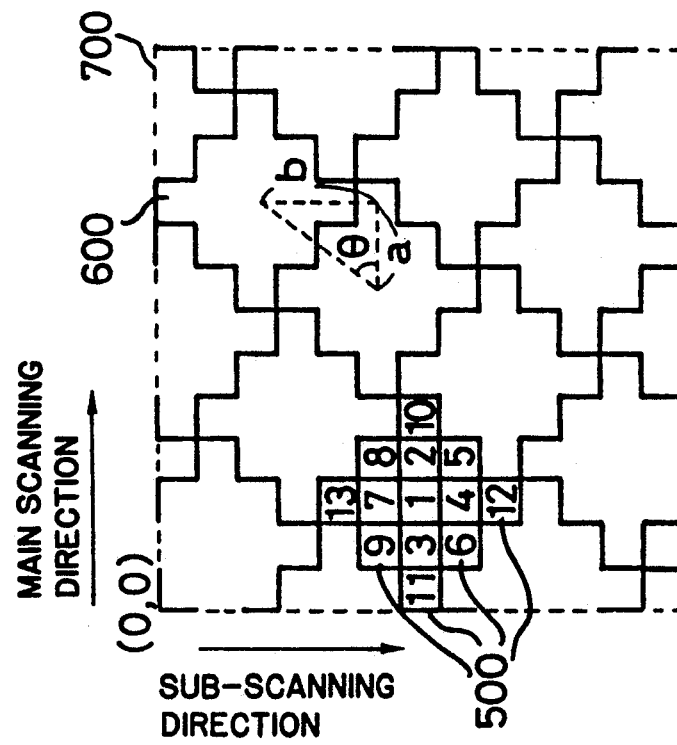
FIG. 4A  Cyan (θ=56.3°)

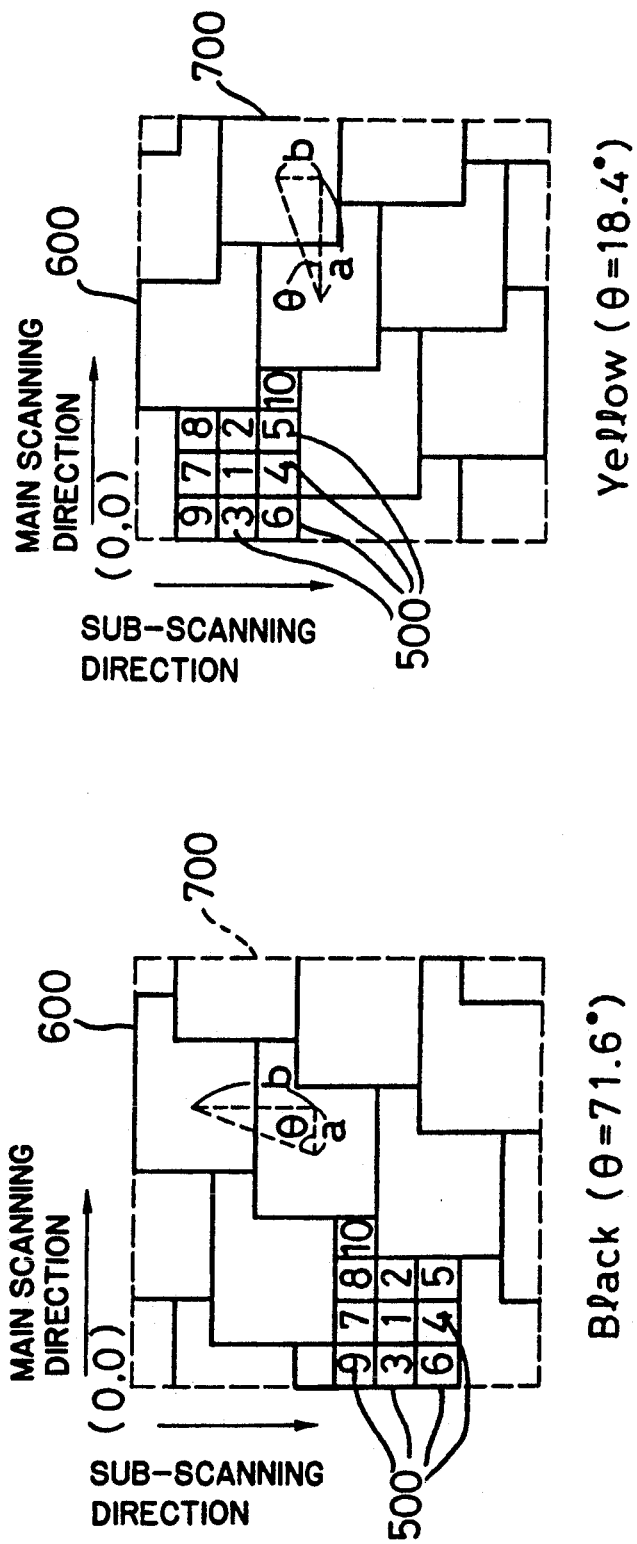

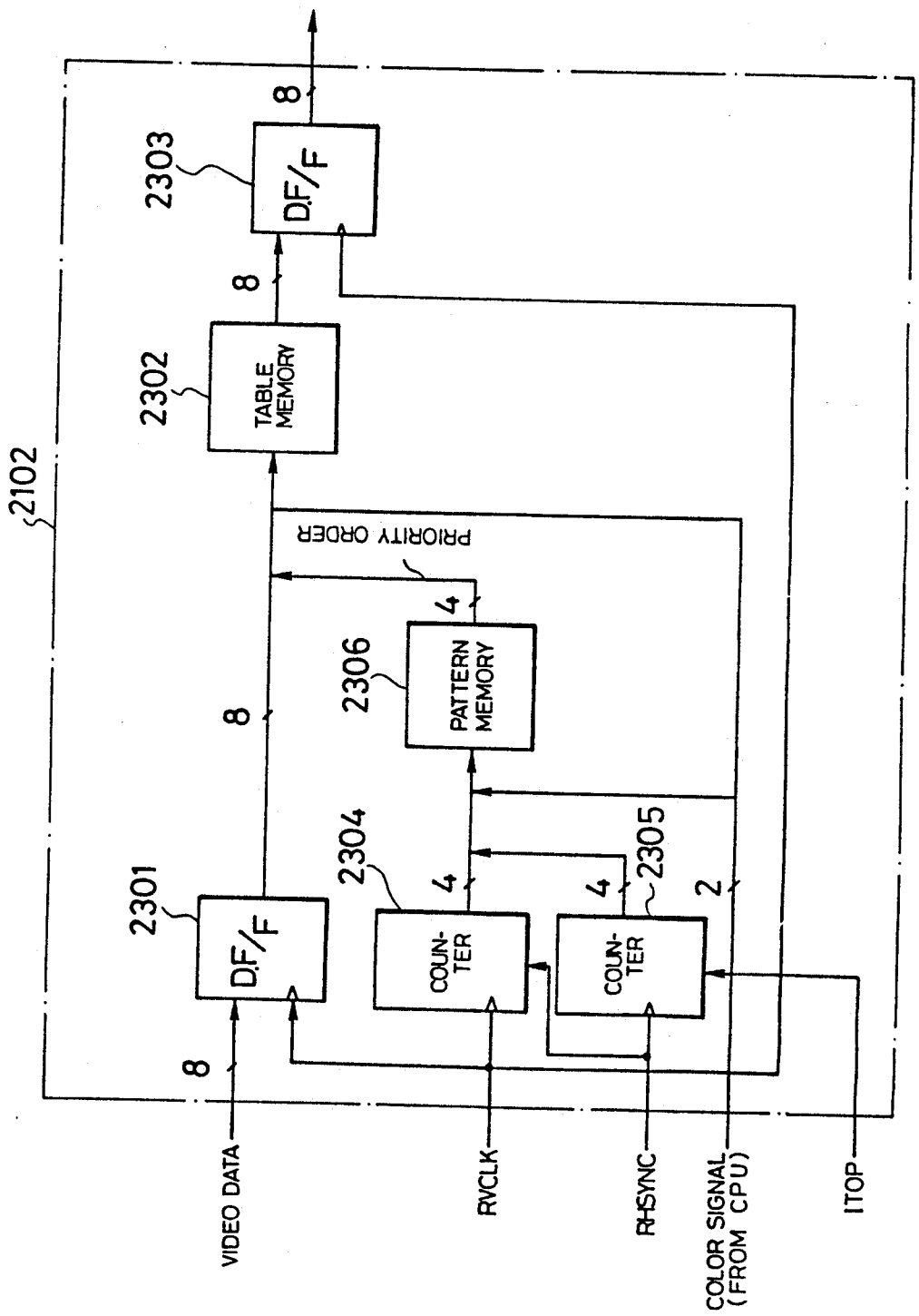

MOIRÉ OF 10° DIFFERENCE

MOIRÉ DUE TO MUTI-LINE SCREEN

MOIRÉ OF 5° DIFFERENCE

MOIRÉ DUE TO CONCENTRICAL CIRCLE SCREEN

MOIRÉ OF 2° DIFFERENCE

MOIRÉ DUE TO MULTI-LINE SCREEN + DOTS

F I G. 10
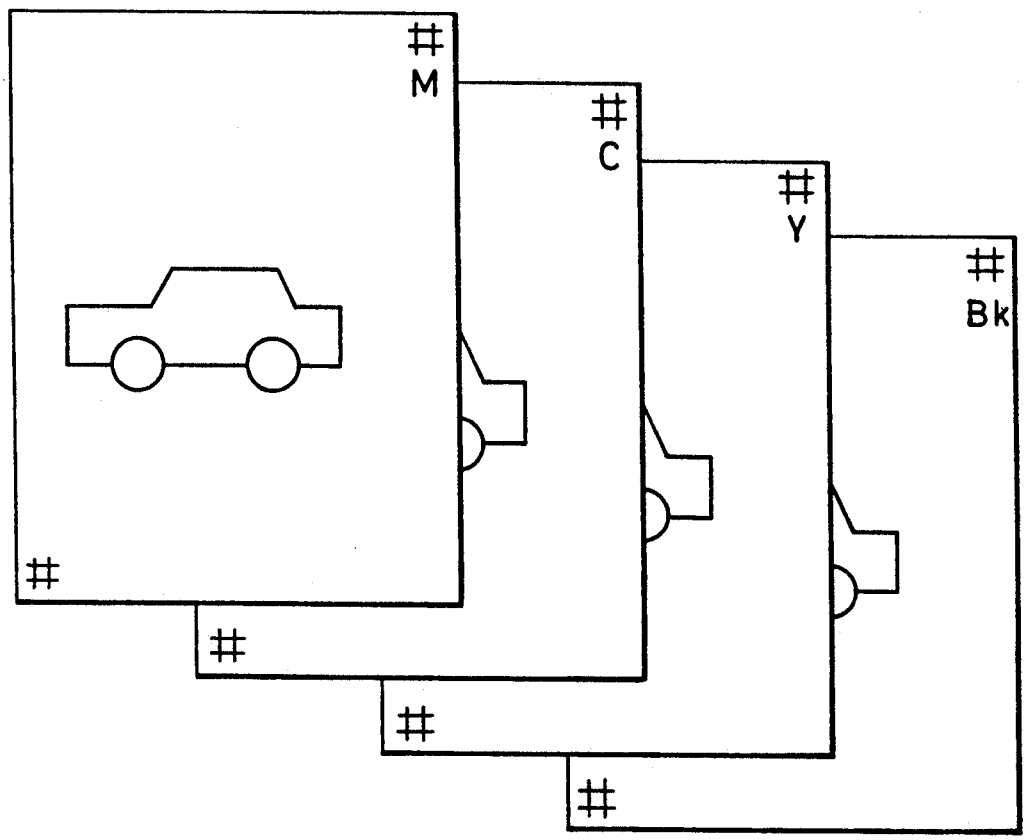

IMAGE FORMING APPARATUS WITH TTL TO ECL CONVERSION BETWEEN READING AND PRINTING CIRCUITS

This application is a continuation of application Ser. No. 07/613,866 filed as PCT/JP90/00594, May 10, 1989, now abandoned.

TECHNICAL FIELD

The present invention relates to an image forming apparatus, and more particularly, to an image forming apparatus which can reproduce an image at high speed.

BACKGROUND ART

In a conventional apparatus of this type, a pulse-width modulated signal according to an image density is formed, and a laser is caused to emit light on the basis of the pulse-width modulated signal, thereby forming a dot latent image on a photosensitive drum.

However, if transmission or drive lines among a circuit for generating the pulse-width modulated signal, a laser driver, and a laser diode are long, a halftone pattern cannot be satisfactorily reproduced.

More specifically, a laser ON time for a low-density portion of a halftone portion is, e.g., 5 nsec, and ultra-high-speed driving must be performed. In a conventional circuit, when a semiconductor laser is driven, since a pulse signal must be transmitted to a semiconductor laser element over a certain distance, the waveform of the pulse signal is distorted, and small pulses are made unstable. As a result, the laser cannot accurately emit light.

DISCLOSURE OF INVENTION

The present invention has been made in consideration of the above situation, and has as its object to obtain a multi-gradation image output.

According to an aspect of the present invention, since a pulse modulated signal forming section and a driver section for driving a recording element are integrated, a waveform of a pulse modulated signal can be prevented from being distorted, and an accurate recording operation can be performed.

According to another aspect of the present invention, since a light-emitting element used for recording and driver section for driving the light-emitting element are integrated, a waveform of a pulse modulated signal can be prevented from being distorted, and an accurate light-emitting operation can be performed.

According to still another aspect of the present invention, since a pulse modulated signal forming section is isolated from other circuits in terms of a signal level, a waveform of a pulse modulated signal can be prevented from being influenced by other circuits.

According to still another aspect of the present invention, since a digital signal for forming a pulse modulated signal is ECL-converted (emitter coupled logic) and the converted signal is transmitted to an analog pulse modulation signal forming circuit, an analog pulse modulated signal can be prevented from being influenced by a digital circuit. Other objects of the present invention will be apparent from the following detailed description.

BRIEF DESCRIPTION OF THE DRAWINGS

FIGS. 1A and 1B are functional block diagrams of a digital color reader/printer according to an embodiment;

FIG. 2A is a detailed block diagram of a digital gradation control circuit according to the embodiment.

FIG. 3A is a timing chart of principal signals in a printer section;

FIGS. 4A to 4D are views for explaining dot processing patterns of the embodiment;

FIG. 5 is a block diagram of a dot processing circuit of the embodiment;

FIG. 10 is a view showing an output image obtained by font synthesis in the font control circuit of the embodiment;

BEST MODE FOR CARRYING OUT THE INVENTION

An embodiment of the present invention will be described in detail below with reference to the accompanying drawings.

Description of Mechanism Section

Figure 11:
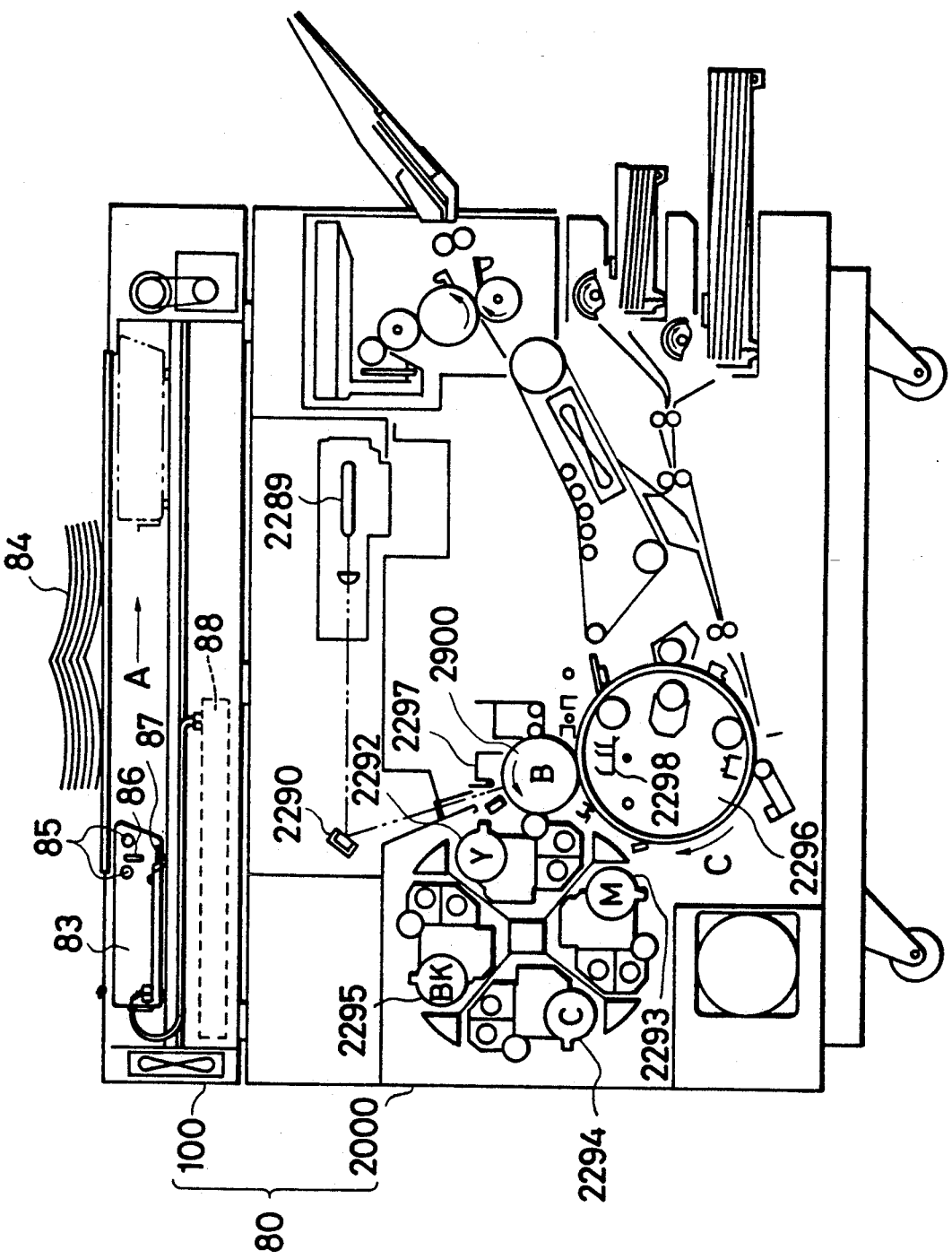
FIG. 11 is a cross-sectional view of a mechanism section of the digital color reader/printer of the embodiment.

FIG. 11 is a cross-sectional view of a mechanism section of a digital color reader/printer of this embodiment. A reader/printer 80 comprises a reader section 100 for color-separating and reading a color original image, and a printer section 2000 for forming a color reproduced image or printing plates (color-separated images) separated into color plates.

In the reader section 100, reference numeral 83 denotes an original scanning unit, which subscans in a direction of an arrow A while an exposure lamp 85 is kept ON so as to read an original 84 placed on an original table. Light reflected by the original 84 is guided to a converging rod lens array 86, and is focused on a contact type color CCD sensor unit 87. This CCD sensor chip has a resolution of, e.g., 16 pels (62.5 $\mu$m), and consists of 1,024 pixels. Five sensor chips are arranged as a whole, and are arranged in a staggered manner in a main scanning direction. Furthermore, each pixel of the sensor chip is divided into three 15.5 $\mu$m $\times$ 62.5 $\mu$m regions, and cyan (C), green (G), and yellow (Y) color filters are adhered to these regions. In this manner, an optical image formed on the CCD sensor unit 87 is converted into C, G, and Y electrical signals, and these signals are sent to a signal processing block 88. The signal processing block 88 converts these C, G, and Y electrical signals into yellow (Y), magenta (M), cyan (C), and black (BK) digital video data, and sends these data to the printer section 2000 in units of colors.

In the printer section 2000, the input video data are density-modulated (=pulse-width (PWM) modulated) directly, or after they are subjected to dot processing, or after a font pattern is partially synthesized therein in some cases. The PWM-modulated binary signals ON/-OFF-drive a laser beam. This laser beam is converted into a high-speed horizontal (main) scanning beam by a polygonal mirror 2289 which is rotated at high speed. The main scanning beam is further reflected by a mirror 2290, and then performs dot exposure corresponding to the video data on the surface of a photosensitive drum 2900. In this case, one main scanning length of the laser beam corresponds to that of video data. In other words, a beam dot of this embodiment has a resolution of 16 pels.

The photosensitive drum 2900 is rotated at a constant speed in a direction of an arrow B. The photosensitive drum is uniformly precharged by a charger 2297. The video data are beam-dot exposed on the uniformly charged photosensitive drum surface, thus forming an electrostatic latent image of each color separation plate. For example, electrostatic latent images are formed in the order of the color plates Y, M, C, and BK upon each revolution of the drum. The electrostatic latent image of each color plate is converted into a toner image by a corresponding one of developing units 2292 to 2295, and the toner image is transferred onto a recording member (e.g., a paper sheet) wound around a transfer drum 2296.

The above operations will be explained in correspondence with a single original exposure/scanning operation of the reader section 100. A Y component of an original is extracted by first original scanning, a dot image of the Y component is exposed on the photosensitive drum, the dot image is developed by the Y developing unit, and the obtained toner image is transferred onto the recording member. An M component of the original is extracted by the second original exposure/-scanning, a dot image of the M component is exposed on the photosensitive drum, the dot image is developed by the M developing unit, and the obtained toner image is transferred onto the recording member. Thereafter, exposure, development, and transfer processes are similarly repeated for C and BK components.

Although not shown, in this case, a feed operation and movement of the recording member are controlled. More specifically, color plate data are color-synthesized on a single recording member to obtain a normal color copy. Recording members are changed in units of color plates, and respective color images are transferred onto recording members corresponding in number to separated colors (Y, M, C, BK, and the like), thus forming color printing plates.

Although not shown, in the latter case, a color used for development is further controlled. That is, respective color plate data may be developed using corresponding Y, M, C, and BK colors. Instead, respective color plate data may be developed in only one (e.g., a BK color) of Y, M, C, and BK. In this case, printing plates can be easily compared and evaluated, and colors in color printing may be determined by printing inks. Although the printer mechanism section of this embodiment employs a color printer in this case, it may be replaced with a conventional printer mechanism section using one BK color.

Description of Functional Blocks

Figure 1B:
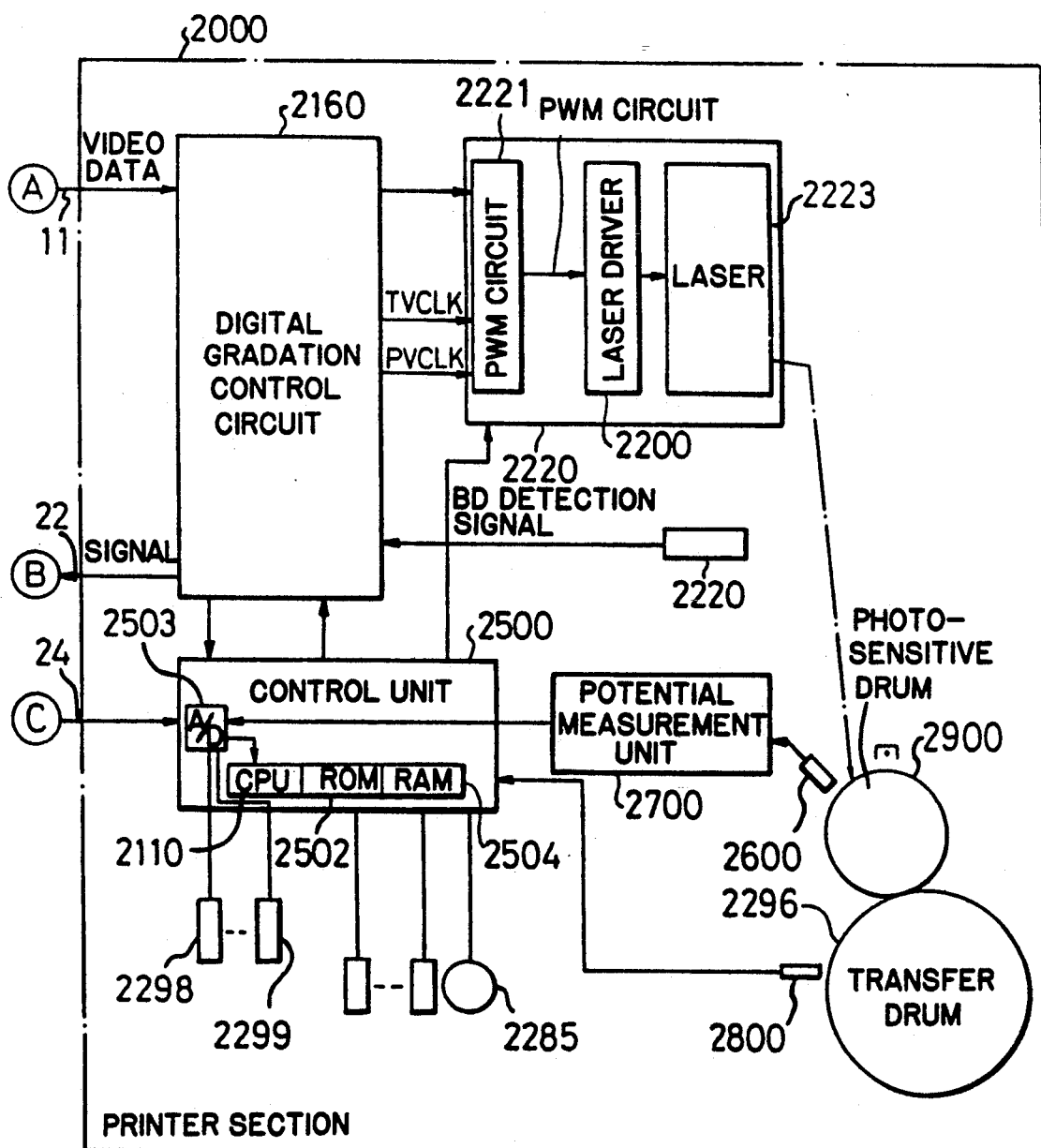

FIGS. 1A and 1B are functional block diagrams of the digital color reader/printer according to the embodiment. FIG. 1A is a functional block diagram of the reader section 100, and FIG. 1B is a functional block diagram of the printer section 2000.

In FIG. 1A, reference numeral 10 denotes a control unit for performing main control of the reader section 100. The control unit 10 comprises a CPU 10-1, a ROM 10-2 for storing a control program shown in, e.g., FIG. 12 which is executed by the CPU 10-1, and a RAM 10-3 which is used as a work memory by the CPU 10-1. More specifically, the control unit 10 controls a motor 12 via a motor driver 13, and causes the original scanning unit 83 to perform read scanning of an original image. In this case, the CPU ON-controls the exposure lamp 85 via a constant voltage regulator (CVR). The CPU accepts a print (start) instruction signal, and other key operation signals from an operation unit 16, and sets various print operation modes. For example, the operation unit 16 comprises a print mode setting switch (not shown). In response to, e.g., an expression mode instruction from this switch, the control unit 10 sets an operation mode such that characters, line images, and the like are printed in a high-resolution dot mode, and a photographic image is printed in a multi-gradation mode. In response to a copy mode instruction, the control unit sets an operation mode such that color-separated signals are color-synthesized on a single recording paper sheet. In response to a printing plate forming mode instruction, the control unit sets an operation mode such that color plates are formed on recording members corresponding in number to the separated colors. Various other instructions are available. The control unit 10 transmits this print operation mode to the printer section 2000 via a communication line 24.

Reference numeral 1 denotes a synchronization signal processing unit which has a main function of generating various timing signals for the reader side in synchronism with a BD signal (printer section horizontal synchronization signal) supplied from the printer section 2000 via a line 22. Reference numeral 2 denotes a contact type color CCD sensor (87) which reads an original image in synchronism with the reader section horizontal synchronization signal (RHSYNC signal) from the synchronization signal processing unit 1, and outputs read image signals 5. The read image signals 5 are output in the order of, e.g., C, G, and Y signals in units of pixels. In this embodiment, since the CCD sensor consists of five chips, signals for five channels are simultaneously generated. Reference numeral 3 denotes a signal processing unit for performing waveshaping processing, e.g., edge emphasis, to prevent high-frequency components of the read image signals 5 from being attenuated.

Reference numeral 6 denotes an image processing unit. The image processing unit 6 comprises an analog processing unit 7, a joint memory 8, and an image processing unit (IPU) 9. The analog processing unit 7 separates C, G, and Y signals in units of pixels into C, G, and Y signals in units of colors. The unit then forms red (R), green (G), and blue (B) color signals in units of pixels on the basis of the separated C, G, and Y signals. This formation is performed by the following arithmetic processing:

$(R) = (Y) - (G)$ $(G) = (G)$ $(B) = (C) - (G)$

The obtained R, G, and B signals are luminance signals, and have linear relationships with corresponding output voltages. These signals are density (LOG) converted, and are then converted into 8-bit Y, M, and C density data (image data) by an A/D converter. The Y, M, and C image data correspond to five channels of the CCD chip, and are not synchronized among channels. The joint memory 8 stores these data so that the Y, M, and C image data for five channels are synchronized with each other. More specifically, the joint memory stores the data such that 1,024×5 pixels arranged in a staggered manner in the main scanning direction are substantially aligned in line. Thereafter, the control unit 10 selects a desired color signal from the Y, M, and C image data from the joint memory 8, and sends the selected color signal to the image processing unit (IPU) 9 in units of colors. The IPU 9 performs, e.g., shading correction processing for correcting a luminous intensity distribution, and masking processing for correcting a saturation. 8-bit video data per pixel as a result of processing are sent from the IPU 9 to the printer section 2000 via a signal line 11.

In FIG. 1B, reference numeral 2500 denotes a control unit for performing main control of the printer section 2000. The control unit 2500 comprises a CPU 2110, a ROM 2502 for storing a control program shown in, e.g., FIGS. 13A and 13B, which is executed by the CPU 2110, a RAM 2504 which is used as a work memory by the CPU 2110, an A/D converter 2503 for converting analog detection signals from various external sensor circuits into digital signals, and the like. The control unit 2500 controls rotation of a driving motor 2285 so that the photosensitive drum 2900, the transfer drum 2296, and the like are rotated at constant speeds. The control unit A/D-converts a charge amount on the surface of the photosensitive drum 2900, which is detected by a potential sensor 2600 and is input via a potential measurement unit 2700, and fetches the digital data. The control unit also fetches an image top signal (ITOP) detected by a sensor 2800. The control unit A/D-converts and fetches a humidity signal, a temperature signal, and the like detected by a humidity sensor 2298, a temperature sensor 2299, and the like, and uses these digital data to, e.g., correct developing characteristics of a printer. The control unit 2500 exchanges various kinds of information with the control unit 10 of the reader section via the communication line 24.

Reference numeral 2160 denotes a digital gradation control circuit which has main functions of synchronizing an image clock signal (RCLK) of the reader section 100 with an image clock signal (VCLK) of the printer section 2000, of performing dot processing of input video data as needed, and of gradation-converting the input video data or dot-processed video data in accordance with an image output mode or in correspondence with output characteristics of the printer. Furthermore, the digital gradation control circuit outputs clocks TVCLK and PVCLK which are synchronous with video data for forming a triangular waveform and have different periods. Furthermore, gradation-converted video data is PWM-modulated by a PWM circuit 2221 into a binary signal according its density. Reference numeral 2200 denotes a laser driver for ON/OFF-driving a beam emitted from, e.g., a semiconductor laser 2223 in accordance with the PWM signal from the PWM circuit 2221. The PWM circuit 2221, the laser driver 2200, and the semiconductor laser 2223 are formed on a single circuit board 2220, and data and clocks are transmitted from the digital gradation control circuit 2160 to this circuit board 2220 at ECL level. This operation will be described in detail later.

FIG. 2A is a detailed block diagram of the digital gradation control circuit of this embodiment. In FIG. 2A, a portion of the input video data is input to a dot-processing look-up table {LUT(1)} 2101, and is converted into dot-processing video data. The LUT(1) of this embodiment comprises a ROM or a RAM. When video data dot-processed by the next dot processing circuit 2102 is output through an electrophotographic process, the LUT(1) is a conversion table for converting the input video data to obtain a desired dot-processing effect. The LUT(1) will be described in detail later. Reference numeral 2102 denotes a dot processing circuit for performing dot processing (to be described later) of the dot-processing video data output from the LUT(1). For example, the processing circuit converts video data into dot-processed video data such that video data is divided into predetermined areas, and a pixel density in each divided area is concentrated or represented by the density at the central pixel position, and inputs the converted data to an A-side terminal of a selector 2103.

The other portion of the video data is input to a B-side terminal of the selector 2103 to be used when no dot processing is performed. The selector 2103 selects one of the dot-processed and non-dot-processed video data in accordance with a select signal 2123 from the CPU 2110, and outputs the selected data. For example, in a mode for forming printing plates, dot-processed video data is preferably selected and output. When a normal color copy is to be output, either dot-processed or non-dot-processed video data can be selected. That is, various print modes are available, and various combinations of signal processing operations among processing circuits (to be described later) are therefore available in accordance with these print modes.

The video data selected by the selector 2103 is input to an A-side terminal of a selector 2104. A B-side terminal of the selector 2104 receives font data from a font ROM 2108. The font data is used to synthesize (or insert) a font pattern of, e.g., a character or a symbol in a portion of the selected video data. As will be described later, the CPU 2110 sets a font code and an address for synthesizing it, so that a desired font pattern can be synthesized in one or a plurality of portions of video data in each color plate.

8-bit video data output from the selector 2104 is input to a buffer memory (FIFO) 2105 in synchronism with the RHSYNC signal and the RCLK signal from the reader section 100. The stored video data is read out in synchronism with a horizontal synchronization signal (HSYNC signal) and a video clock signal (VCLK signal) from a printer synchronization control circuit 2113. Thus, speeds between the reader section 100 and the printer section 2000 are matched.

The video data read out from the buffer memory 2105 is input to a look-up table {LUT(2)} 2106 for correcting printer characteristics. The LUT(2) is used to generate corrected video data so that the input video data is matched with printer output characteristics (e.g., a beam spot size, a toner particle size, and the like) (that is, gradation of an output density is enhanced, and becomes linear). The LUT(2) will be described in detail later with reference to FIGS. 8A to 8D.

Figure 2B:
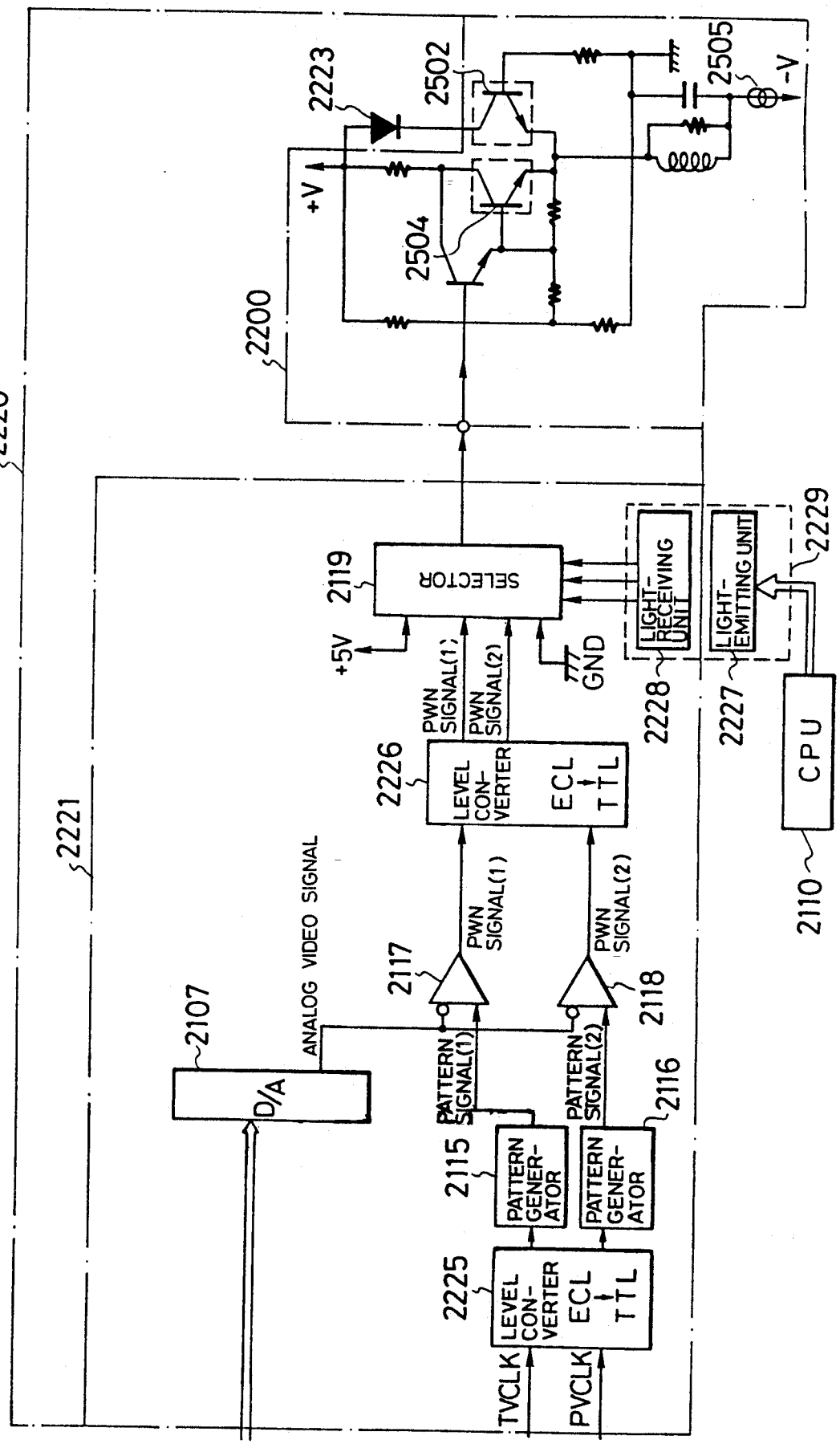
FIG. 2B is a detailed circuit diagram of a PWM circuit and a laser driver arranged on a single circuit board.

The video data output from the LUT(2) is converted from a TTL-level (transistor-transistor logic) signal into an ECL-level signal by a level converter 2161, and is ECL-transmitted to the PWM circuit 2221 on the circuit board 2220 shown in FIG. 2B. The digital gradation control circuit 2160 comprises a TTL circuit. The TTL circuit comprises a signal line and a ground GND line. In this case, a level on the GND line follows a level variation on the signal line, and when a signal of 10 MHz or higher is processed in the PWM circuit in this embodiment, a serious problem is posed. Thus, in this embodiment, data is ECL-transmitted, so that a variation in signal level of the TTL circuit is cut off from the PWM circuit 2221 to stabilize the ground level of the PWM circuit. That is, the digital gradation control circuit 2160 and the circuit board 2220 are common to each other in terms of the GND level, but are isolated from each other in terms of a signal level since data is ECL-converted.

A difference between TTL transmission and ECL transmission will be explained below. In a TTL mode, a signal is transmitted by a level difference between the signal line and the ground level GND. Therefore, when the ground level varies, the signal level also varies. When a pattern signal is formed based on a high-frequency clock, TTL transmission is not suitable. On the other hand, ECL transmission is not influenced by the ground level since a signal is differentially transmitted by a signal level Q and its inverted signal $\bar{Q}$. Since ECL transmission is suitable for high-speed handling of a high-frequency pulse, it is also suitable for transmission of digital data.

Note that as a method of isolating signal levels, a method adopting photocoupling or transformers for electrically isolating signal levels in both DC and AC manners, or a method of transmitting a frequency signal by differential transmission regardless of a ground reference level like in this embodiment, may be employed. As a method of transmitting signals using a common ground level regardless of a ground reference level, current mode transmission, choke coil transmission, and the like are also available. One of these isolation methods may be employed.

A crystal oscillator (XTAL) 2112 generates a clock signal having a frequency four times or more that of a video clock signal. The synchronization control circuit 2113 forms a main scanning synchronization signal (HSYNC signal) and a fundamental clock signal (SCLK signal) in synchronism with the BD signal and an ITOP signal. A frequency divider 2114 frequency-divides the SCLK signal to generate pattern generation clock signals (TVCLK and PVCLK signals). The clock signals TVCLK and PVCLK are converted from TTL level into ECL level by a level converter 2162. That is, the clock signals are ECL-transmitted to the PWM circuit 2221 so as not to be influenced by noise from, e.g., the charger of the printer and a variation in signal level in the digital gradation control circuit 2160.

In the PWM circuit 2221, the ECL-level digital video data from the level converter 2161 is input to a D/A converter 2107, and is converted into an analog video signal which changes stepwise. The analog video signal is input to one input terminal of each of comparators 2117 and 2118. The other input terminal of each of the comparators 2117 and 2118 receives a corresponding one of pattern signals (1) and (2) for binarizing (PWM-modulating) the analog video signal according to its density. The pattern signals (1) and (2) are formed by pattern generators 2115 and 2116 based on clock signals which are reconverted to TTL-level signals by a level converter 2225. The pattern signal (1) is used to reproduce or generate a line image or a dot image, and its resolution is important in this case. Therefore, the pattern signal (1) is a pattern signal having the same frequency (e.g., 400 lines) as that of a video signal. More specifically, one pattern signal is generated per pixel. The pattern signal (2) is used to reproduce a halftone image, and gradation must be enhanced in this case. Therefore, the pattern signal (2) is a pattern signal having a frequency ½ that of the line image pattern signal (e.g., 200 lines). More specifically, one pattern signal is generated per two pixels.

More specifically, the clock signal TVCLK is a clock signal having a frequency twice that of a video data signal, and a duty ratio of 50%. The pattern generator 2115 generates the analog pattern signal (1) according to this TVCLK signal. In this case, the pattern signal (1) is a triangular wave signal. The comparator 2117 compares the analog video signal and the pattern signal (1) to output a PWM signal (1) obtained by pulse-width modulating (PWM-modulating) a corresponding video density.

The PVCLK signal is a clock signal having a frequency ½ (or ⅔) that of a video data signal and a duty ratio of 50%. The pattern generator 2116 generates the analog pattern signal (2) in accordance with this PVCLK signal. In this embodiment, the pattern signal (2) is also a triangular wave signal. The comparator 2118 compares the analog video signal and the pattern signal (2) to output a PWM signal (2) obtained by pulse-width modulating (PWM-modulating) a corresponding video density. The PWM signals (1) and (2) are reconverted from ECL level to TTL level by a level converter 2226, and the converted signals are output to a selector 2119.

For example, when a line image original is to be reproduced or is to be dot-processed and output, the selector 2119 selects and outputs the PWM signal (1) at its A-side terminal according to a control signal from the CPU 2110. When a halftone image is to be reproduced, the selector 2119 selects the PWM signal (2) a its B-side terminal.

Note that these selections can be desirably modified, and various combinations are available in association with other processing circuits.

A 3-bit control signal from the CPU 2110 is transmitted via a photocoupler 2229. The photocoupler 2229 comprises a light-emitting unit 2227 and a light-receiving unit 2228, so that a variation in signal level of the CPU 2110 does not influence the PWM circuit 2221. The selector 2119 is arranged to select not only the PWM signals (1) and (2) but also a signal of +5 V and a signal of the ground level GND, so that the laser does not emit light in an unnecessary region.

This switching signal is not limited to that from the CPU 2110. For example, although not shown, a known image area separation means for discriminating whether a video signal belongs to a line image area or a halftone image area in units of pixel may be arranged, and image area separation may be used as a switching signal. In this manner, a faithful and high-quality image according to an original image tone can be obtained within one image. The selected PWM signal (1) or (2) is thus input to the laser driver 2200, and constant-current drives the semiconductor laser 2223 for a time according to a pulse width of the PWM signal, thereby forming an electrostatic latent image on the surface of the photosensitive drum 2900. The semiconductor laser 2223 emits a laser beam when a switching transistor 2502 is kept ON, and stops emission of the laser beam when the transistor 2502 is turned off. The switching transistor 2502 forms a current switching circuit together with a transistor 2504 paired with the transistor 2502, and ON/OFF-controls (commutation-controls) a constant current to be supplied to the semiconductor laser 2223 in accordance with the input PWM signal. The constant current is supplied from a constant current source 2505.

As described above, the PWM circuit 2221, the laser driver 2200, and the semiconductor laser 2223 are arranged on the single circuit board. Since the semiconductor laser is arranged on the single circuit board, a signal level from the laser driver 2200 is not externally influenced. Since the PWM circuit 2221 and the laser driver 2200 are also isolated from the digital gradation control circuit 2160 and the CPU 2110 in terms of signal level, they are not influenced by these circuits, either.

Figure 14:
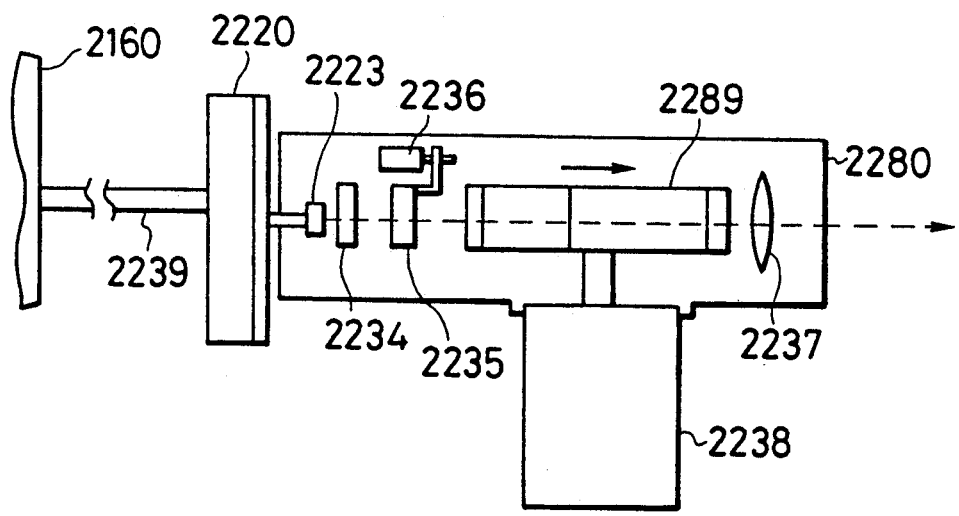
FIG. 14 is a sectional view showing an arrangement of a laser modulation driver unit.

FIG. 14 shows an arrangement of the laser modulation circuit board 2220 and its peripheral components. Reference numeral 2280 denotes a scanning optical system for scanning a laser beam emitted from the semiconductor laser 2223 by the polygonal mirror 2289. The scanning optical system 2280 comprises a collimator lens 2234 for collimating the beam from the semiconductor laser, a lens 2235 and its actuator 2236 for varying a focal point of the beam on the drum, an fθ lens 2237, the polygonal mirror 2289, a polygonal motor 2238 for driving the polygonal mirror 2289 at a predetermined rotational speed, and the like. The laser modulation driver circuit board 2220 includes the D/A converter 2107, the pattern generators 2115 and 2116, the comparators 2117 and 2118, the selector 2119, the laser driver 2200, and the like shown in FIG. 2B, terminals of the laser element 2223 is directly mounted on the circuit board 2220. The ECL-converted digital video data from the LUT(2) 2106 and the ECL-converted clock signals TVCLK and PVCLK from the frequency divider 2114 are ECL-transmitted to the laser modulation driver circuit board 2220 via a cable 2239. The select signal for the selector 2219 supplied from the CPU 2110, is optically transmitted through the photocoupler. In this embodiment, analog signal processing circuits and light-emitting element driving circuits are integrated on a common circuit board, and a digital signal is ECL-transmitted to the analog processing circuits through the cable. Note that reference numeral 2160 in FIG. 14 denotes a board constituting the digital gradation control circuit such as the LUT(2) 2106, the frequency divider 2114, and the like shown in FIG. 2A.

In this manner, in this embodiment, since a light modulation speed is as fast as several nsec, circuits are constituted not by TTL level but by ECL level, and the length of an analog signal transmission path does not influence light modulation. In particular, it is important to employ an ECL differential transmission method between the board 2160 and the circuit board 2220, and to perform digital transmission.

In this embodiment, a signal is transmitted from the CPU 2110 to the board 2220 using the photocoupler. Alternatively, an output level of the CPU may be ECL-converted to be transmitted to the board 2220. Furthermore, the above-mentioned other isolation methods may be adopted.

The circuit board 2220 and the optical system 2289 are mounted to be slightly spaced apart from each other so as to be prevented from being electrically short-circuited but may be integrally formed using an insulating sheet.

The digital video data is ECL-transmitted but may be transmitted using a photocoupler. The digital gradation control circuit, the CPU, and an analog pulse modulation signal forming unit (e.g., the PWM circuit) are isolated in terms of signal level, so that the adverse influences of other circuits can be removed. Furthermore, since the semiconductor laser is integrated with the laser driver, a distance between the driver and the laser can be shortened, and the influence of noise from other circuits or other parts such as the charger can be prevented.

FIG. 3A is a timing chart of principal signals in the printer section. FIG. 3A illustrates the horizontal synchronization signal BD, a blanking signal, the reference clock signal SCLK, the pattern generation clock signals TVCLK and PVCLK, the video clock signals VCLK, and the like.

Figure 3B:
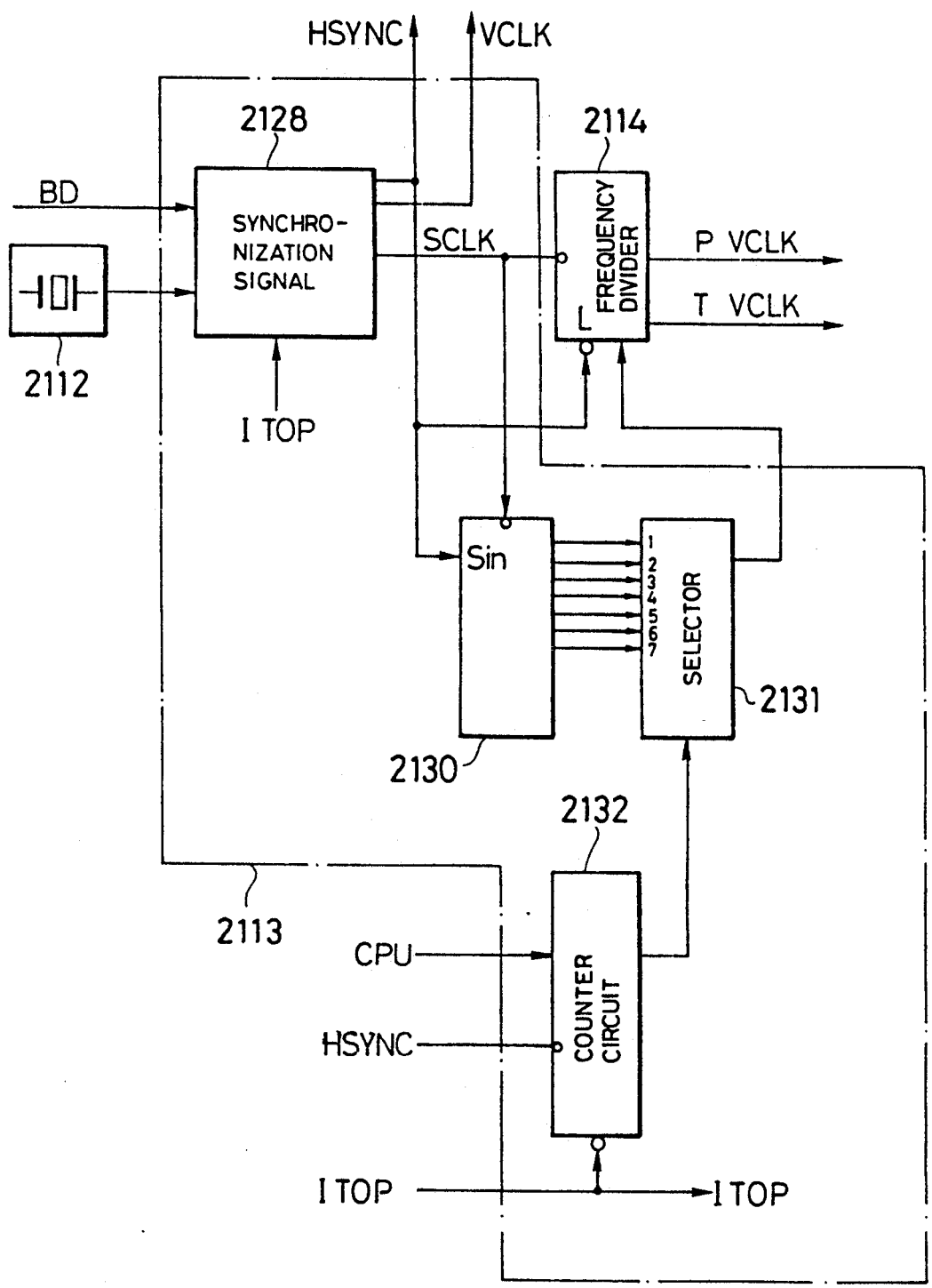
FIG. 3B is a detailed block diagram of a synchronization control circuit unit.

FIG. 3B is a detailed block diagram of the synchronization control circuit unit. In FIG. 3B, a crystal oscillator 2112 generates a clock signal having a frequency four times that of a video clock signal to a synchronization circuit 2128. The synchronization circuit 2128 outputs the HSYNC, VCLK, and SCLK signals at timings clock-synchronized with the BD and ITOP signals from an external circuit. The frequency divider 2114 receives the SCLK signal, and outputs the TVCLK signal having the same period as the VCLK signal and a duty ratio of 50%, and the PVCLK signal having a period twice (three times) that of the VCLK signal and a duty ratio of 50%. Although not shown, the blanking signal is formed by a counter, which is reset in response the trailing edge of the BD signal, for measuring a time shorter than a BD signal period.

A PVCLK' signal in FIG. 3A will be described below. The PVCLK' signal is valid when screen angle control is performed for video data which is not subjected to dot processing (i.e., when a normal halftone image is to be reproduced). The PVCLK' signal is a clock signal having a phase delayed by, e.g., 1.5 pixels from the HSYNC signal. As compared to the PVCLK signal having a regular phase, the PVCLK' signal is delayed by one pixel. In this embodiment, when, e.g., a normal halftone image is to be reproduced, the PVCLK and PVCLK' signals are selectively used for each or several lines in the sub-scanning direction with respect to the HSYNC signal. For example, if these signals are switched for each line, 45° screen angle control is attained.

In FIG. 3B, the HSYNC signal is input to a shift register 2130, and is shifted in response to the SCLK signal. Outputs of the respective stages of the shift register 2130 are connected to the input terminals of a selector 2131. A counter circuit 2132 is reset in response to the ITOP signal, and is then set with count program information from the CPU 2110 in advance. The count program information is count sequence information for repeating counting from 2 to 5 as a count value output or for repeating counting from 2 to 6 as a count value output. The counter circuit 2132 counts the HSYNC signal in accordance with this information. For example, every time the HSYNC signal is generated, the counter circuit counts like 3→4→5→3→4→5. The count value is input to the selection terminal of the selector 2131. When the count value is "3", the selector 2131 selects and outputs a signal at an input terminal "3", and when the count value is "4", it selects and outputs a signal at an input terminal "4". The output from the selector 2131 is input to a frequency-division start terminal of the frequency divider 2114. Meanwhile, the frequency divider 2114 is reset beforehand by the HSYNC signal, and stops its count function. When the signal from the selector 2131 is input, the frequency divider starts the frequency-division operation at that time. Thus, the PVCLK and TVCLK signals having different phases in units of lines can be generated. The relationship with a screen angle will be explained below. If a screen angle $\theta$ is defined as:

$$\theta = \tan^{-1} b/a$$

a value a is determined by the count value of the counter circuit 2132, and a value b is determined by a count sequence. These values can be freely set by the CPU 2110.

Description of Dot Processing

In the dot processing to be described below, dot processing (e.g., to concentrate or represent a pixel density to or by that at a central pixel position) of a density of image data divided into predetermined areas and optimal screen angle control are simultaneously executed in real time.

The dot correction look-up table {LUT(1)} will be described in detail below.

Figure 7:
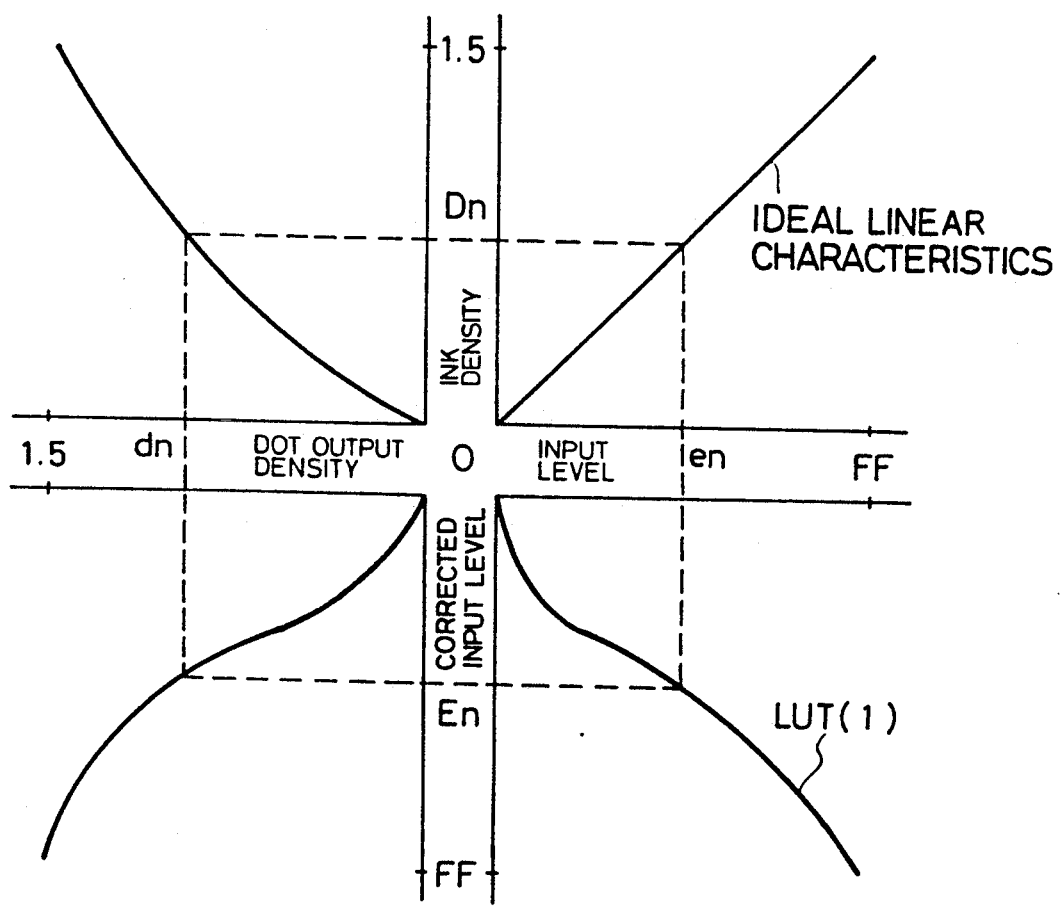
FIG. 7 is a chart for explaining conversion characteristics of an LUT(1) of the embodiment.

FIG. 7 is a chart for explaining conversion characteristics of the LUT(1) of this embodiment. In FIG. 7, Y, M, and C video data and an ink (or toner) density have a linear relationship therebetween. However, when the dot processing to be described later is performed, the linear relationship cannot be maintained. Thus, the input Y, M, and C video data are density-corrected in advance. The first quadrant in FIG. 7 represents the relationship between an input level and an ink density before correction, i.e., the linear relationship. An ink density plotted along the ordinate is that obtained when printing is performed using color separation plates output by the apparatus of this embodiment. The second quadrant represents the relationship between an ink density and a dot output density level. The third quadrant represents the relationship between the dot output density level and a corrected input level. The fourth quadrant represents the relationship between the corrected input level and the input level before correction, and gives conversion characteristics of the LUT(1).

If the color separation plates of this embodiment can constitute ideal dots, the dot output densities in third and fourth quadrants may be used as a dot density (%).

Actual table information is obtained by, e.g., actual measurement. For example, when an ink density $D_n$ is to be obtained at a non-corrected input level $e_n$, a dot output density $d_n$ for yielding the ink density $D_n$ is obtained. Then, a corrected input level $E_n$ for yielding the dot output density $d_n$ is obtained. Thus, the LUT(1) can be formed to obtain the corrected output level $E_n$ in response to the non-corrected input level $e_n$. In this manner, all the conversion levels corresponding to input levels 0 and 225 or 00H to FFH, where the suffix H indicates a hexadecimal number are obtained. When the conversion characteristics are varied in units of colors, the LUT(1) is prepared in units of colors.

FIGS. 4A to 4D are charts for explaining dot processing patterns of this embodiment. FIG. 4A shows an example for C data. In FIG. 4A, reference numeral 500 denotes one pixel, and respective pixels are illustrated as an array from a start address (0,0) of data for one image. Reference numeral 600 denotes a fundamental cell, which corresponds to a block unit for performing dot processing of densities in a bold line region (predetermined area) (for concentrating or representing a pixel density to or by, e.g., that at the central pixel position). The fundamental cell of C data consists of e.g., 13 pixels. Numerals (1 to 13) added to the pixels in the fundamental cell represent the priority order, and the priority order is lowered from 1 to 13. The same priority order is given to data for the same color in other fundamental cells.

The illustrated priority order is an example corresponding to printer characteristics of this embodiment, and the present invention is not limited to this. Various other modifications are available.

The dot processing of a pixel density in each fundamental cell is performed according to the following equation (dot formula).

That is, (Output data of pixel of interest) =
    (Input data of pixel of interest) ×
    (Number of pixels in fundamental cell) −
                  (Priority order − 1) × FFH
For
FFH: Maximum density (H represents hexadecimal notation)

This calculation is performed while sequentially moving a pixel of interest in the main scanning and sub-scanning directions in FIG. 4A. For example, when a pixel of interest is located at a position of the priority order 11:

(Output density) = (Input density) × 13 − (11 − 1) × FFH

Since the priority order is as low as 11, a density to be subtracted {(priority order−1)×FFH} becomes large, and a density at this pixel position is relatively lowered. As a result, when (output density)<0, the output density is clamped to "00H". Contrary to this, when (output density)>FFH, the output density is clamped to "FFH".

Similarly, when a pixel of interest is located at a position of the priority order 1:

(Output density) = (Input density) × 13 − (1 − 1) × FFH

Since the priority order is 1, a density to be subtracted is zero. In this manner, the pixel density is concentrated toward the central pixel position in the fundamental cell, and is represented by a density at that position. A printing plate formed by dot processing has a good ink balance, and is stable.

Reference numeral 700 denotes a matrix, which corresponds to a block unit in which a dot processing pattern shown in FIG. 4A is repetitively used in the main scanning and sub-scanning directions. The matrix size of C data is, e.g., (13×13) pixels. As can be seen from FIG. 4A, when a plurality of matrices are joined in the main scanning and sub-scanning directions, an original image having any size can be processed. In this embodiment, by utilizing this periodicity, this matrix pattern is stored in a memory, and is repetitively used in real time, thus achieving both a decrease in pattern memory size and high-speed calculations.

A triangle in FIG. 4A defines a screen angle $\theta$, which represents an inclination of an arrangement of the fundamental cell 600. In FIG. 4A, if a and b are determined, the screen angle $\theta$ is given by:

$$\theta = \tan^{-1} b/a$$

For example, $\theta = 56.3°$ is given as the screen angle for C data.

FIG. 4B shows an example of a dot processing pattern for M data. In FIG. 4B, a fundamental cell 600 consists of 13 pixels, and has the same shape as that in FIG. 4A. $\theta = 33.7°$ is given as the screen angle. Upon comparison of FIG. 4B with FIG. 4A, the fundamental cell 600 for the M data has a different way of start (phase angle) from an address (0,0). For this reason, the central pixel positions in these two patterns do not overlap each other. In other words, principal density data do not overlap each other. As a result, C and M inks can be prevented from overlapping each other during printing, and high-quality and stable printing can be performed.

FIG. 4C shows an example of a dot processing pattern for BK data. Note that BK data is generated based on C, M, and Y data by a known method. In FIG. 4C, a fundamental cell 600 consists of 10 pixels, and has a different shape from those shown in FIGS. 4A and 4B. Although the present invention is not limited to this shape, the pattern is suitable for giving, e.g., $\theta = 71.6°$ as a screen angle. This pattern also has a different phase angle from an address (0,0).

FIG. 4D shows an example of a dot processing pattern for Y data. In FIG. 4D, a fundamental cell 600 consists of 10 pixels. Although the present invention is not limited to this shape, the pattern is suitable for giving, e.g., $\theta = 18.4°$ as a screen angle. This pattern also has a different phase angle from an address (0,0).

FIG. 5 is a block diagram of the dot processing circuit of this embodiment. In FIG. 5, dot-processing video data output from the LUT(1) is latched by a D type flip-flop (D·F/F) 2301 in synchronism with the RVCLK signal. Meanwhile, a counter 2304 is reset by the RHSYNC signal, and then counts the RVCLK signal. More specifically, this counter forms a main scanning address in FIGS. 4A to 4D. A counter 2305 is reset by the ITOP signal, and then counts the RHSYNC signal. More specifically, this counter forms a sub-scanning address in FIGS. 4A to 4D.

Although not shown, count initialization data according to colors to be processed are set in the counters 2304 and 2305 by the CPU 2110, and these counters repeat count operations using count values according to the initialization data. For example, when C or M data is to be processed, each counter repetitively outputs count values 0 to 12. When BK or Y data is to be processed, each counter repetitively outputs count values 0 to 9.

Reference numeral 2306 denotes a pattern memory for storing dot processing patterns (priority order data) shown in FIGS. 4A to 4D. In response to a color select signal (Y, M, C, BK) from the CPU 2110, the priority order data in one of matrices shown in FIGS. 4A to 4D are sequentially read out along with a progress of main scanning and sub-scanning operations. Reference numeral 2302 denotes a table memory for receiving input data of a pixel of interest and corresponding priority order data, and outputting output data of the pixel of interest according to the above-mentioned dot formula. In this case, in response to the color select signal from the CPU 2110, a table for the number of pixels in each fundamental cell = 10 or 13 is selectively used in the same manner as described above. The readout output data of the pixel of interest is set in a D.F/F 2303 in synchronism with the RVCLK signal, and is output to the next circuit.

Note that the memories 2302 and 2306 may comprise ROMs or RAMs. In place of adopting a look-up table system using memories, a hardware calculation circuit may be adopted.

Figure 6A:
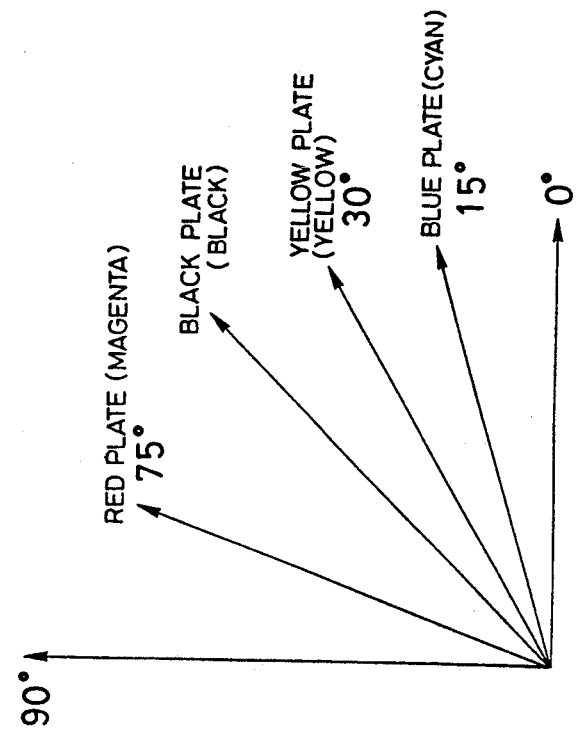
FIG. 6A is a view showing a screen angle distribution of the embodiment.
Figure 6B:
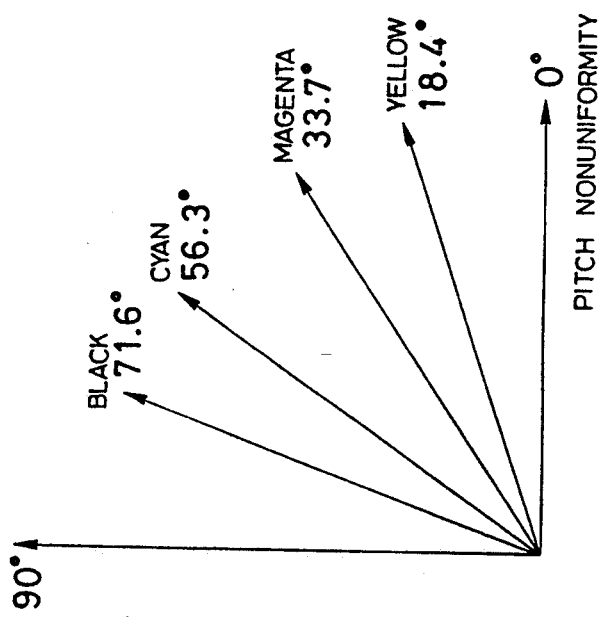
FIG. 6B is a view showing a screen angle distribution used in a conventional printing field.
Figure 6C:
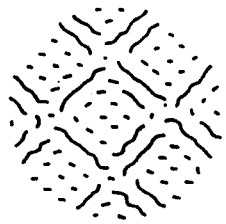
FIGS. 6C to 6H are views showing moiré stripes.
Figure 6D:
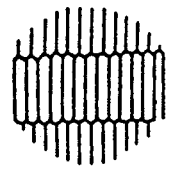
Figure 6E:
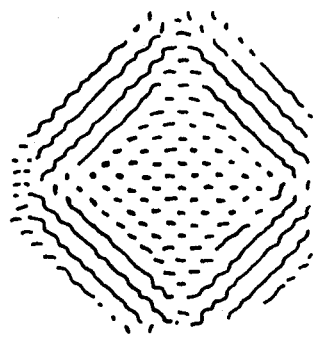
Figure 6F:
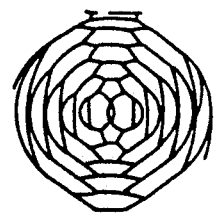
Figure 6G:
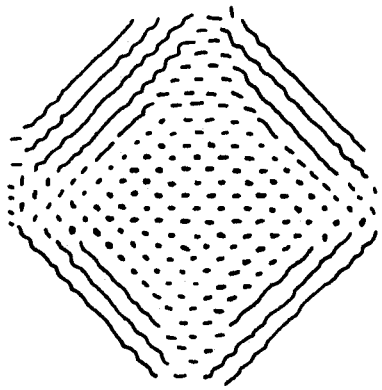
Figure 6H:
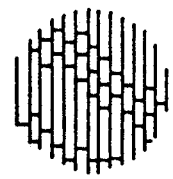

FIG. 6A shows a screen angle distribution of this embodiment, FIG. 6B shows a screen angle distribution used in a conventional field of printing, and FIGS. 6C to 6H show moirè stripes.

In the field of printing techniques, since, e.g., (13×13) glass fibers can be bundled, it is easy to precisely maintain distributed screen angles during printing. In this embodiment, since the laser beam printer is used, rotation nonuniformities of the polygonal mirror 2289 and the photosensitive drum 2900 must be taken into consideration. More specifically, since the two rotation nonuniformities are synthesized, a nonuniformity of a laser radiation light amount per unit time occurs, and the radiation nonuniformity influences formation of a latent image on the photosensitive drum, and formation of a toner image. As a result, this nonuniformity appears as density nonuniformity (pitch nonuniformity) in an output image. The pitch nonuniformity is considered as a high-frequency component having an angle of 0° or 90° in association with a dot-processed image. In general, moirè appears in a color plate having a small angular difference from the pitch nonuniformity. For this reason, when image formation is made at the same angles as those in a printing method, M and C components tend to be easy to see as moirè with respect to the pitch nonuniformity. This is equivalent to "moirè due to multi-line screen and dots" shown in FIG. 6H. In this embodiment, a Y component which is not conspicuous relative to spectral luminous efficiency is set to have a screen angle near 0°, so that moirè is not easy to see. Although BK is originally a color which is easy to see, BK component data of this embodiment is corrected by the reader section 100 so that a low-density region does not overlap a minimum value of each color component as a density (not shown). For this reason, since the pitch nonuniformity is a light amount nonuniformity, as described above, it tends to be seen easier in a low-density region than in a high-density region. Therefore, if black is set to be an angle near 0° or 90°, moirè with the pitch nonuniformity is not conspicuous.

FIGS. 8A to 8D are views for explaining conversion characteristics of the printer output characteristic LUT(2) of this embodiment. In a printer output image, an input data level and a printer output density must have linear characteristics in correspondence with the characteristics of a printer to be used. When a toner particle size is not sufficiently smaller than a beam spot size, a maximum of 32 toner particles can only be attached even if an output beam has 256 gray scale levels. This can express only 32 gray scale levels, resulting in inconvenience. Assume that a (2×2) dot area, or generally, an (n×m) dot area is set as a printer output unit, and an intra-area density will be examined. For example, linear gradation expression is allowed up to 32×2=64 gray scale levels, and up to 256 gray scale levels.

In order to realize this, image data for, e.g., m pixels can be PWM-converted based on a pattern signal (triangular wave) having a period m times that of a pixel period in the main scanning direction. It is desired to obtain the same effect as in the main scanning direction for n lines in the sub-scanning direction. However, if a method of repeating the same main scanning in the sub-scanning direction is adopted like in this embodiment, the same effect cannot be obtained. Thus, for the sub-scanning direction, a plurality of kinds of gradation conversion tables are prepared, and are selectively used in a predetermined sequence, thus obtaining the same effect as in the main scanning direction.

The LUT(2) is a table used for this purpose, and is prepared in consideration of systematic output characteristics of the laser beam printer of this embodiment. As output characteristics of the laser beam printer, the relationship between a beam pulse width and a surface potential of the photosensitive drum (EV characteristics), and the relationship between the surface potential of the photosensitive drum and an output image density (VD characteristics) are known. Since the former EV characteristics have substantially linear characteristics the LUT(2) will be exemplified as a table for correcting the latter VD characteristics. The VD characteristics vary depending on whether or not dot processing of image data is performed, or depending on a frequency of a PWM modulation signal (pattern signal) and a developing agent to be used or the like. For this reason, a plurality of tables are prepared in correspondence with the VD characteristics, and are selectively used by the CPU 2110 as needed.

A case will be explained below wherein no dot processing is performed, and a pattern signal frequency to a comparator is ½ or ⅓ a video signal frequency.

Figure 8A:
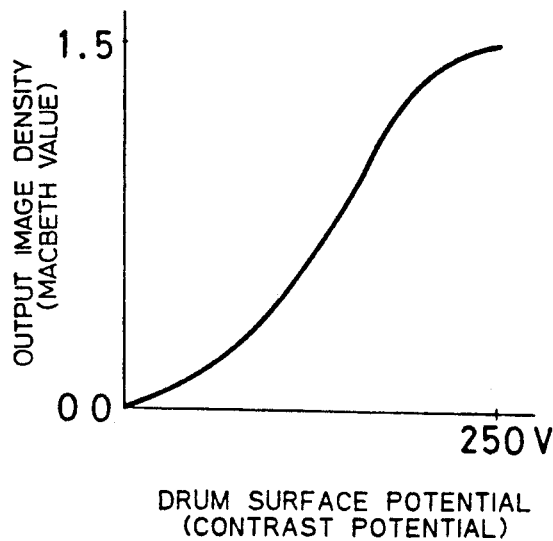
FIGS. 8A to 8D are charts for explaining conversion characteristics of an LUT(2) of the embodiment.
Figure 8B:
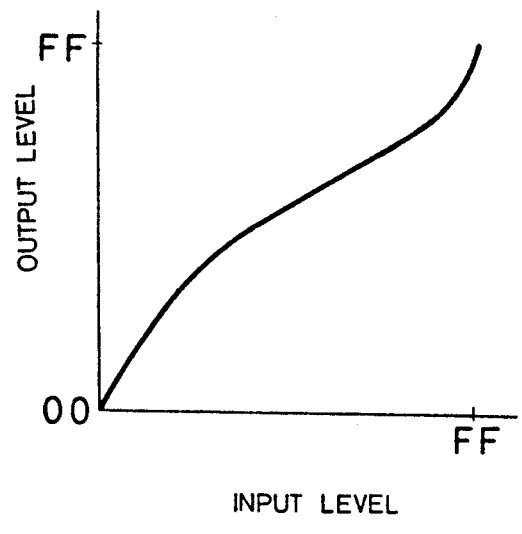

FIG. 8A shows the VD characteristics of this embodiment. In FIG. 8A, a drum surface potential plotted along the abscissa represents a difference potential (contrast potential) between the surface potential of the photosensitive drum and a developing bias potential. FIG. 8B shows characteristics for converting the VD characteristics shown in FIG. 8A into linear characteristics. That is, this object can be attained by replacing the abscissa and the ordinate in FIG. 8A, thus obtaining the characteristic table shown in FIG. 8B. However, this embodiment wants to further improve gradation of an output image (especially, gradation of a highlight portion). Thus, conversion tables are selectively used in correspondence with ½ or ⅓ a pattern signal frequency for each or several lines, e.g., for a cycle of two or three lines in the sub-scanning direction, thereby attaining linear gradation and concentrating dots.

Figure 8C:
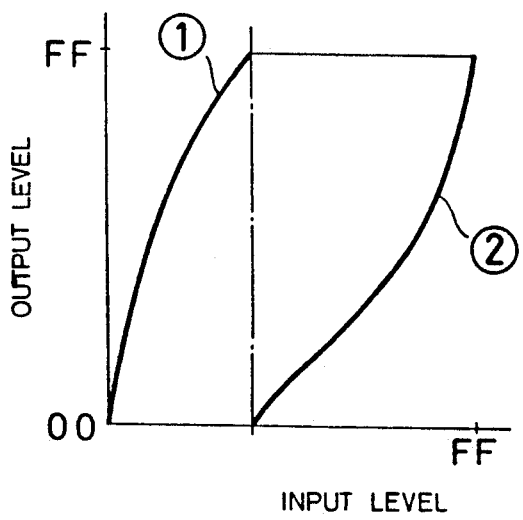

FIG. 8C is a chart showing correction table characteristics of this embodiment used when a pattern signal frequency is ½ a video signal frequency. In FIG. 8C, in a table of characteristics ①, an output level is initially increased up to a level FFH at an inclination twice that of a curve shown in FIG. 8B, and thereafter, is constant until an input level reaches FFH. In a table of characteristics ②, an output level keeps a level 00H until the table output of the characteristics ① reaches the level FFH, and thereafter, is increased up to the level FFH at an inclination twice that of the curve shown in FIG. 8B. In this case, since the pattern signal frequency is ½, one output density dot is formed by a video signal for two pixels. Meanwhile, in the sub-scanning direction, the tables ① and ② in FIG. 8C are selectively used for each line to have two lines as one period. Thus, a high-density region is defined by the table ①, and a low-density region is defined by the table ②. As a result, one output density dot is formed by two lines in the sub-scanning direction. Note that table characteristics are not limited to ① and ②.

Figure 8D:
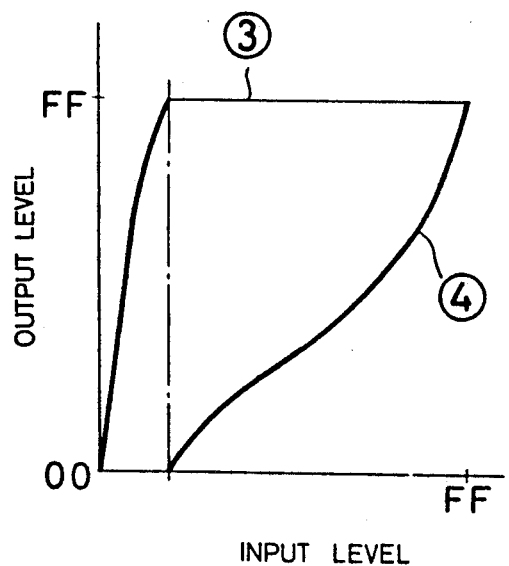

FIG. 8D is a chart showing correction table characteristics of this embodiment used when a pattern signal frequency is ⅓ a video signal frequency. As described above, the VD characteristics depends on the pattern signal frequency. However, in this case, the same VD characteristics are used for the sake of descriptive convenience. In FIG. 8D, in a table of characteristics ③, an output level is initially increased up to a level FFH at an inclination three times that of a curve shown in FIG. 8B, and thereafter, is constant until an input level reaches FFH. In a table of characteristics ④, an output level keeps a level 00H until the table output of the characteristics ③ reaches the level FFH, and thereafter, is increased up to the level FFH at an inclination 1.5 times that of the curve shown in FIG. 8B. In this case, since the pattern signal frequency is ⅓, one output density dot is formed by a video signal for three pixels. Meanwhile, in the sub-scanning direction, the tables ③ and ④ in FIG. 8D are selectively used for each line to have three lines as one period. For example, the tables are switched like ④→③→④. Thus, low- and high-density regions are formed in units of output lines, and one output density dot is formed by three lines in the sub-scanning direction. Note that table characteristics are not limited to ③ and ④.

In practice, since the VD characteristics vary depending on the pattern signal frequency, the tables shown in FIGS. 8C and 8D are prepared in correspondence with the different VD characteristics. Formation of the tables are not limited to the case wherein the pattern signal frequency is ½ or ⅓ the video signal frequency. The same applies to other frequencies.

Figure 9:
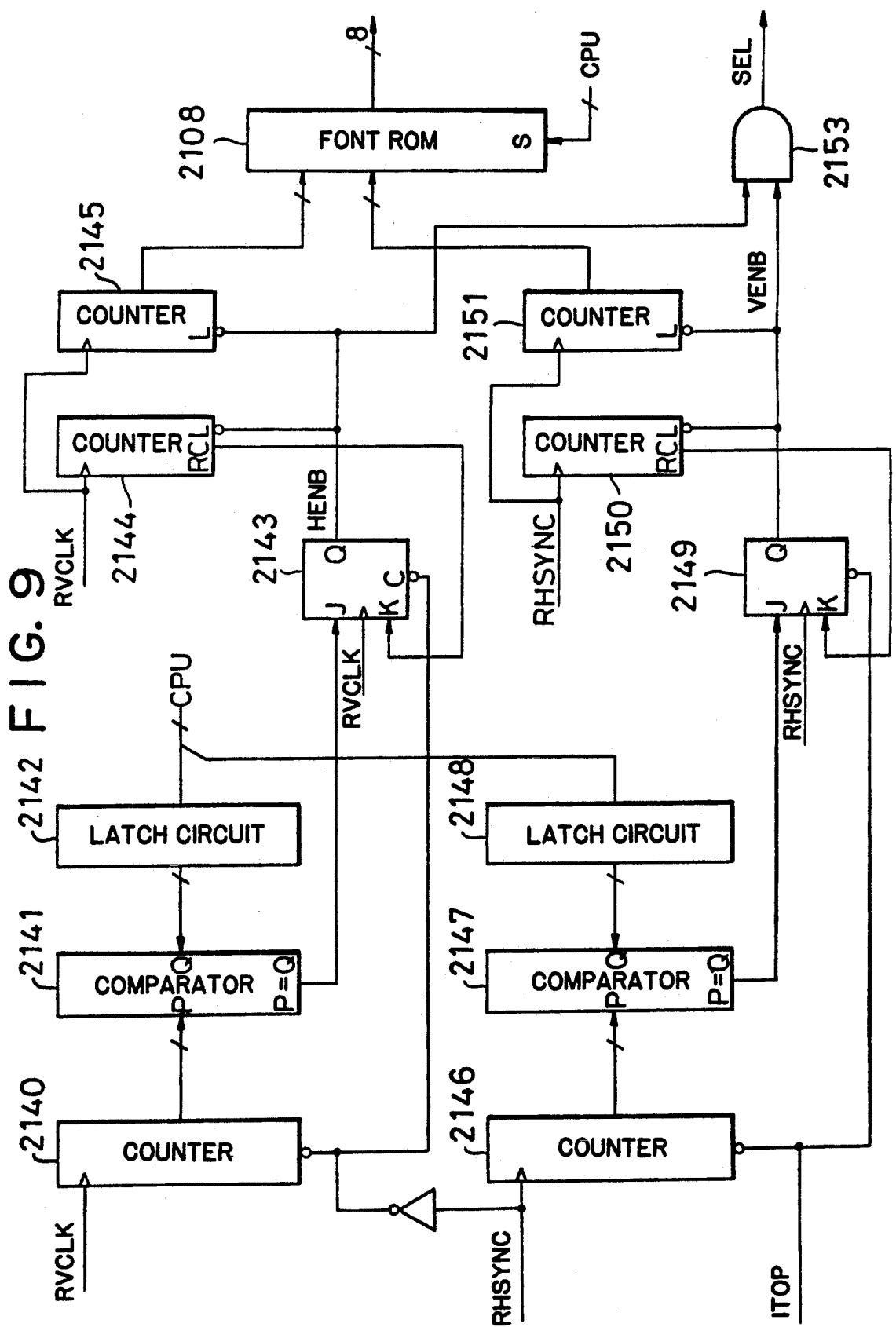
FIG. 9 is a detailed block diagram of a font control circuit of the embodiment.

FIG. 9 is a detailed block diagram of the font control circuit of this embodiment. The CPU 2110 supplies data to a terminal S of the font ROM 2108 to select a font to be printed. Main scanning address data to be printed is latched by a latch circuit 2142, and sub-scanning address data to be printed is latched by a latch circuit 2148. The address data in the latch circuit 2142 is input to a Q terminal of a comparator 2141, and the address data in the latch circuit 2148 is input to a Q terminal of a comparator 2147. Meanwhile, a counter 2140 is reset by the RHSYNC signal, and counts the RVCLK signal. That is, this counter counts the number of pixels in the main scanning direction. A counter 2146 is reset by the ITOP signal, and counts the RHSYNC signal. That is, this counter counts the number of lines in the sub-scanning direction.

The number of pixels of the counter 2140 is input to a P terminal of the comparator 2141. When P=Q is satisfied, the comparator 2141 outputs logic 1 level to a terminal (P=Q). This output corresponds to a character output position in the main scanning direction. Furthermore, this logic 1 level is input to a J terminal of an F/F 2143, and an HENB signal of the F/F 2143 goes to logic 1 level in response to the next RVCLK signal. Meanwhile, a counter 2145 begins to count the RVCLK signal in synchronism with the HENB signal at logic 1 level, and supplies its count output to the main scanning address of the font ROM 2108. A counter 2144 also begins to count the RVCLK signal in synchronism with the HENB signal at logic 1 level, and when it counts a predetermined value, it outputs logic 1 level to its RC terminal. This logic 1 level is input to a K terminal of the F/F 2143, and an HENB signal of the F/F 2143 goes to logic 0 level in response to the next RVCLK signal. Thus, the counters 2144 and 2145 stop counting, and their outputs are reset. As can be seen from the above description, the HENB signals are enabled for each line at corresponding character positions in the main scanning direction.

On the other hand, the number of lines of the counter 2146 is input to a P terminal of the comparator 2147. When P=Q is satisfied, the comparator 2147 outputs logic 1 level to a terminal (P=Q). This output corresponds to a character output position in the sub-scanning direction. Furthermore, this logic 1 level is also input to a J terminal of an F/F 2149, and a VENB signal of the F/F 2149 goes to logic 1 level in response to the next RHSYNC signal. Meanwhile, a counter 2151 begins to count the RHSYNC signal in synchronism with the VENB signal at logic 1 level, and supplies its count output to the sub-scanning address of the font ROM 2108. A counter 2150 also begins to count the RHSYNC signal in synchronism with the VENB signal at logic 1 level, and outputs logic 1 level to its RC terminal when its count value reaches a predetermined value. This logic 1 level is input to a K terminal of the F/F 2149, and the VENB signal of the F/F 2149 goes to logic 0 level in response to the next RHSYNC signal. Thus, the counters 2150 and 2151 stop counting, and their outputs are reset. As can be seen from the above description, the VENB signal is enabled at corresponding character positions in the sub-scanning direction. The HENB and VENB signals are input to an AND gate 2153, thus forming an SEL signal at its output.

In this manner, a font pattern can be synthesized at an arbitrary position of an output image. The CPU 2110 can appropriately change the latch circuits 2142 and 2148 and font selection data, and a plurality of different fonts can be synthesized at arbitrary positions of an image.

FIG. 10 shows an output image obtained by font synthesis in the font control circuit of this embodiment. In FIG. 10, "#" is a registration mark for alignment, and "M, C, Y, and BK" are color information marks for discriminating color plates. The rest of FIG. 10 illustrates color separation plates of an original image read by the reader 100.

Flow Charts

Figure 12:
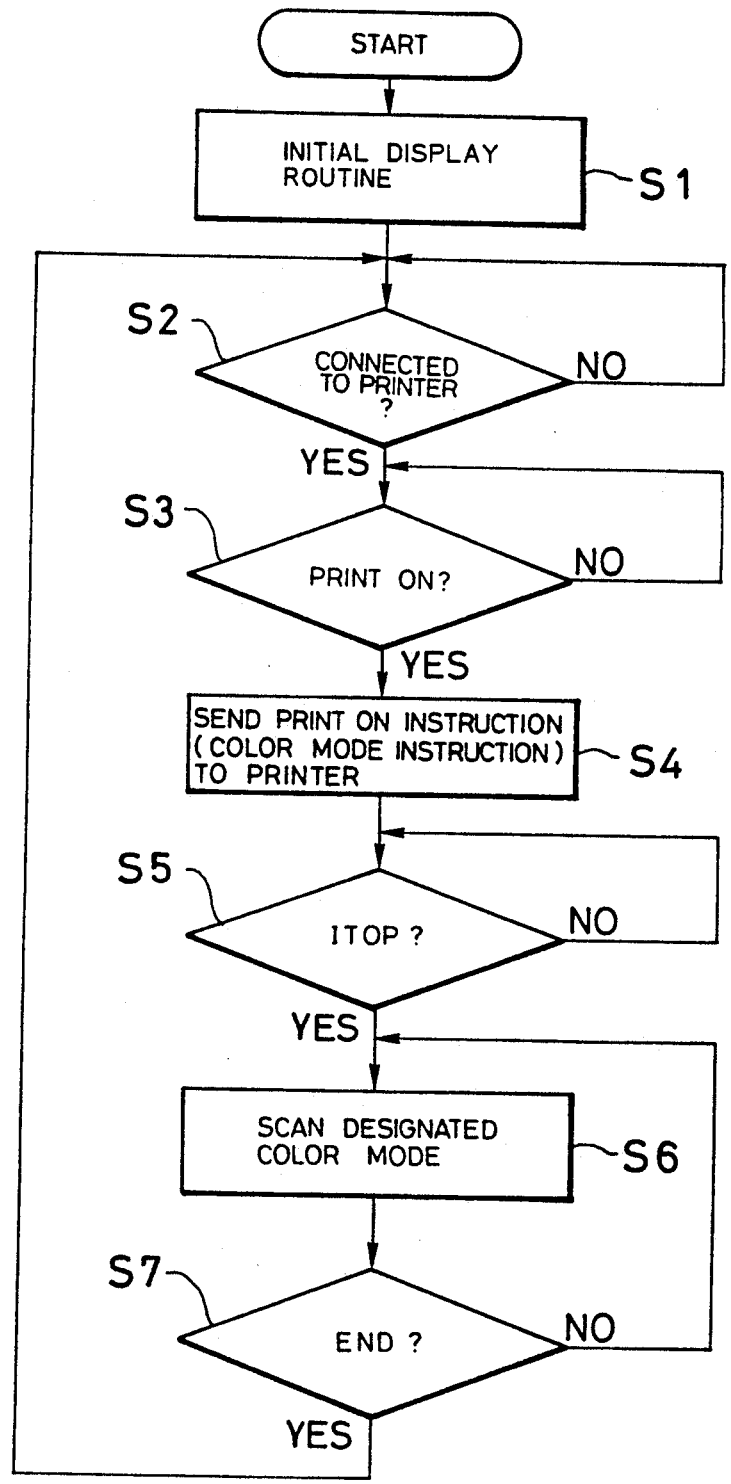
FIG. 12 is a flow chart showing an operation of a control unit 10 in a reader section.

FIG. 12 is a flow chart showing an operation of the control unit 10 of the reader section. This control program is stored in the ROM 10-2. In FIG. 12, when the power switch of the reader section 100 is turned on, an initial display routine is executed in step S1. This routine includes processing, e.g., checking of I/Os, checking of indicators, initialization of the RAM 10-3, setting the original scanning unit at its scanning start position, and the like. In step S2, it is waited until the control unit is connected to the printer control unit 2500 via the communication line 24. When no communication line 24 is connected or when the power switch of the printer section 2000 is kept OFF, no connection state is detected. If a connection state is detected in step S2, the flow advances to step S3, and it is waited until a print (copy) switch of the operation unit 16 is turned on. When the print switch is turned on, the flow advances to step S4, and print mode information and a print ON instruction are output to the printer section 2000. The print mode information includes data indicating whether or not a color separation plate output mode is set, and is output according to an instruction to the operation unit 16. In step S5, the ITOP signal from the printer section 2000 is waited. If the ITOP signal is input in step S5, the flow advances to step S6, and an original image is scanned to output video data to the printer section 2000. In this case, selection data of a printing mode is supplied to the control unit 10 by a scanning unit (not shown). The control unit 10 transmits this data to its components and the control unit 2500 of the printer 2000.

Figure 13A:
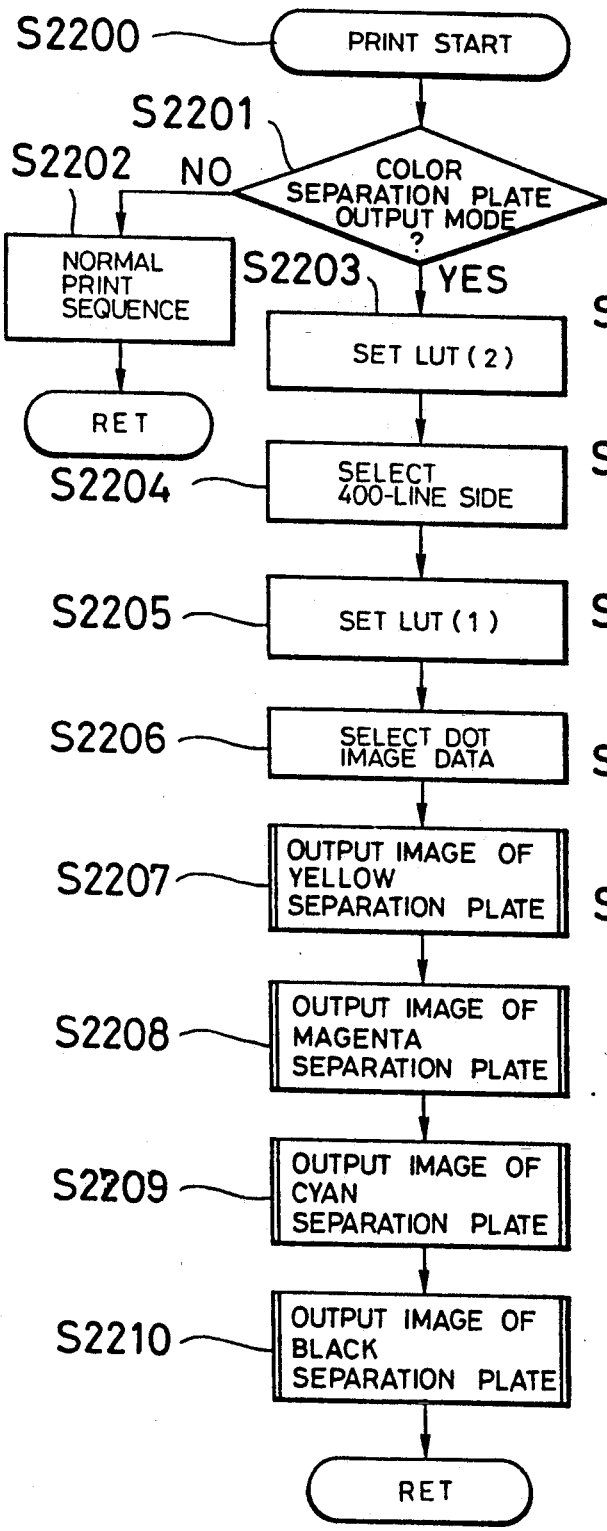
FIG. 13A is a flow chart showing an operation of a control unit 2500 in the printer section.

FIG. 13A is a flow chart showing an operation of the control unit 2500 of the printer section. In FIG. 13A, when the print ON instruction is received from the reader section 100, step S2200 is started. In step S2201, it is checked if the color separation plate (printing plate) output mode is set. If the color separation plate output mode is not set, the flow advances to step S2202, and an image output of, e.g., a color copy is made in a normal print sequence. When the color separation plate output mode is set, look-up tables for a 400-line output mode in the dot processing are set in the printer output characteristic correction RAM (LUT2) 2106 in units of Y, M, C, and K colors in step S2203. In step S2204, a 400-line (A-side) input of the selector 2119 shown in FIG. 2 is selected. In step S2205, look-up tables are set in the dot processing RAM (LUT(1)) in units of Y, M, C, and K colors. In step S2206, the A-side input of the selector 2103 shown in FIG. 2 is selected. In step S2207, an image of a Y separation plate is output onto a first recording member in a processing sequence to be described later. In step S2208, an image of an M separation plate is similarly output onto a second recording member. In step S2209, an image of a C separation plate is similarly output onto a third recording member. In step S2210, an image of a BK separation plate is similarly output onto a fourth recording member.

Figure 13B:
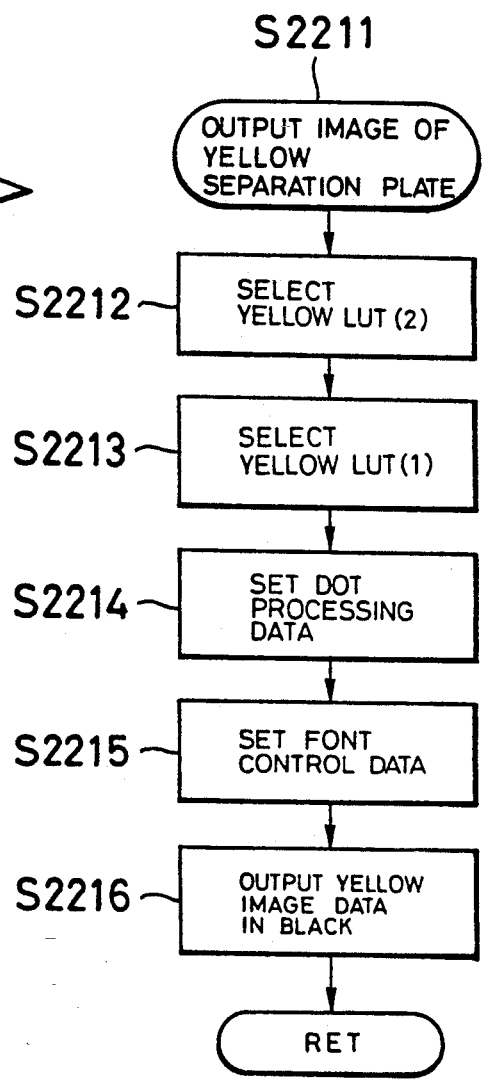
FIG. 13B is a flow chart showing in detail a Y separation plate image output sequence of the embodiment.

FIG. 13B is a flow chart showing in detail a Y separation plate image output sequence of this embodiment. In FIG. 13B, a Y correction table in the LUT2 is selected in step S2212. In step S2213, a Y dot processing table in the LUT(1) is selected. In step S2214, Y initialization data is set in the dot processing circuit 2102 so that an output image can have a Y screen angle. In step S2115, necessary data are set in the font control circuit 2109. The necessary data include a registration mark "#" used for the purpose of registration, a color information mark "Y" indicating the Y separation plate, their output addresses, and the like. In step S2216, image data of the Y separation plate is developed with the black (BK) developing unit 2295 to output an image of the Y separation plate. The remaining M, C, and BK separation plates are developed by the BK developing unit 2295 to have corresponding screen angles with the registration marks "#" and color information marks "M", "C", and "BK", thus outputting images of the color separation plates.

In FIG. 10, images themselves of the color separation plates are printed in black (BK). However, they can be easily discriminated from each other by simultaneously printed letter marks "Y, M, C, and BK". When the registration marks are aligned, precise registration is allowed.

As described above, according to the present invention, a pulse signal to be applied to a recording element can be prevented from being distorted, and a multi-gradation image can be output.

As a pulse modulation signal, a pulse-width modulation signal has been exemplified. Instead, other pulse modulation signals, e.g., a pulse height modulation signal, a pulse density modulation signal, and the like may be used.

As a recording element, a semiconductor laser is used. Instead, other lasers, other light-emitting elements, other high-speed recording elements, e.g., an ink-jet recording element, other beam recording elements, magnetic recording elements, and the like may be used.

The present invention is not limited to the above embodiment, and various changes and modifications may be made within the scope of the claims.

INDUSTRIAL APPLICABILITY

The present invention is effective for a recording apparatus for performing pulse-modulation recording using a recording element, e.g., a laser, an LED, an ink-jet head, or the like, or an apparatus for deflecting and scanning a beam from a beam generation element such as a laser to perform recording, and is particularly suitable for recording a high-frequency signal or forming a multi-gradation image.

We claim:

1. An image forming apparatus for forming an image using a pulse-width modulation signal, comprising:
    a reference clock signal generating circuit means for generating the reference clock signal;
    a sync signal generating circuit means for generating a sync signal on the basis of the reference clock signal;
    a pulse-width modulation circuit means for forming the pulse-width modulated signal in accordance with digital image data;
    a recording element which is pulse-width modulated using the sync signal from said sync signal generating circuit means and an output from said pulse-width modulation circuit means;
    a drive circuit for driving said recording element using an output from said pulse-width modulation circuit means; and
    a single circuit board on which said pulse-width modulation circuit means, said recording element and said drive circuit means are integrally mounted;
    wherein said reference clock signal generating circuit means and said sync signal generating circuit means are mounted separately from said single circuit board and wherein each of said reference clock signal generating circuit means and said sync signal generating circuit means transmits a signal by a level difference between a signal line and a ground level, and said pulse-width modulation circuit means transmits a signal differentially.

2. An image forming apparatus according to claim 1, further comprising an input means for inputting image data, and a digital image control circuit means for processing the image data in a digital signal format, wherein said input means is mounted separately from said single circuit board.

3. An image forming apparatus according to claim 2, wherein signal levels of said digital image control circuit means and said pulse-width modulation circuit means are isolated from each other.

4. An image forming apparatus according to claim 3, wherein said digital image control circuit means comprises a transistor-transistor logic (TTL) circuit, and said apparatus further comprises a conversion circuit for converting the digital image data from a transistor-transistor logic level to an emitter-coupled logic (ECL) level, and transmits output digital data from said conversion circuit to said pulse modulation circuit at the emitter-coupled logic level.

5. An image forming apparatus according to claim 1, further comprising a control circuit for generating a control signal for controlling said pulse-width modulation circuit means, signal levels of said control circuit and said pulse-width modulation circuit means being isolated from each other.

6. An image forming apparatus according to claim 5, further comprising an optical transmission unit for optically transmitting the control signal from said control circuit to said pulse-width modulation circuit means.

7. An image forming apparatus according to claim 1, wherein said pulse-width modulation circuit means comprises a pattern generation circuit for generating a repetitive pattern signal for forming the pulse-width modulated signal.

8. An image forming apparatus according to claim 7, further comprising a clock generation circuit for generating a reference clock signal for the repetitive pattern signal output from said pattern generation circuit, signal levels of said clock generation circuit and said pattern generation circuit being isolated from each other.

9. An image forming apparatus for forming an image, comprising:
    a reference clock signal generating circuit means for generating a reference clock signal;
    a sync signal generating circuit means for generating a sync signal on a basis of the reference clock signal;
    a pulse-width modulation circuit means for forming a pulse-width modulated signal from an input image signal;
    a light beam generation element which is modulated according to the sync signal from said sync signal generating circuit means and the pulse-width modulated signal;
    a drive circuit means for driving said light beam generation element;
    a single circuit board on which said pulse-width modulation circuit means, said drive circuit means and said light beam generation element are integrally mounted; and
    an optical system including a deflection means for deflecting a light beam generated by said light beam generation element;
    wherein said reference signal generating circuit means and said sync signal generating circuit means are mounted separately from said single circuit board and wherein each of said reference clock signal generating circuit and said sync signal generating circuit means transmits a signal by a level difference between a signal line and a ground level, and said pulse-width modulation circuit means transmits a signal differentially, and wherein said optical system and said single circuit board are disposed to be adjacent to each other.

10. An image forming apparatus for forming an image using a pulse-width modulated signal, comprising:
    a digital image processing circuit means for performing digital processing of input image data;
    a pulse-width modulation circuit means for forming the pulse-width modulated signal in accordance with digital image data output from said processing circuit means;

a recording element which is pulse-width modulated using an output from said pulse-width modulation circuit means;

a drive circuit means for driving said recording element using an output from said pulse-width modulation circuit means;

a control circuit means for generating a control signal for controlling said pulse-width modulation circuit means; and a single circuit board on which said pulse-width modulation circuit means, said recording element and said drive circuit means are integrally mounted;

wherein said digital image processing circuit means and said control circuit means are mounted separately from said single circuit board and wherein each of said digital image processing circuit means and said control circuit means transmits a signal by a level difference between a signal line and a ground level, and said pulse-width modulation circuit means transmits a signal differentially.

11. An image forming apparatus according to claim 10, wherein said digital image processing circuit means comprises a transistor-transistor logic (TTL) circuit, and said apparatus further comprises a conversion circuit for converting the digital image data from a transistor-transistor logic level to an emitter-coupled logic (ECL) level, and transmits output digital data from said conversion circuit to said pulse-width modulation circuit means at the emitter-coupled logic (ECL) level.

12. An image forming apparatus according to claim 10, wherein said pulse-width modulation circuit means comprises a pattern generation circuit for generating a repetitive pattern signal for forming the pulse-width modulated signal.

13. An image forming apparatus according to claim 10, wherein said recording element comprises a light generation element.

14. An image forming apparatus according to claim 13, wherein said light generation element comprises a beam generation element for generating a light beam.

15. An image forming apparatus according to claim 1, wherein each of said reference clock signal generating circuit means and said sync signal generating circuit means operates at transistor-transistor logic (TTL) signal levels and said pulse-width modulation circuit means operates at emitter-coupled logic (ECL) signal levels.

16. An image forming apparatus according to claim 4, wherein said conversion circuit means is mounted separately from said single circuit board.

17. An image forming apparatus according to claim 9, wherein each of said reference clock signal generating circuit means and said sync signal generating circuit means operates at transistor-transistor logic (TTL) signal levels and said pulse-width modulation circuit means operates at emitter-coupled logic (ECL) signal levels.

18. An image forming apparatus according to claim 10, wherein each of said digital image processing circuit means and said control circuit means operate at transistor-transistor logic (TTL) signal levels and said pulse-width modulation circuit means operates at emitter-coupled logic (ECL) signal levels.

19. An image forming apparatus according to claim 11, wherein said conversion circuit means is mounted separately from said single circuit board.

* * * * *